(12) United States Patent
Noda et al.

(10) Patent No.: US 10,782,141 B2
(45) Date of Patent: Sep. 22, 2020

(54) ROUTE PLANNING SYSTEM, ROUTE PLANNING METHOD, ARTICLE-ARRANGEMENT PLANNING SYSTEM, ARTICLE-ARRANGEMENT PLANNING METHOD, DECISION-MAKING SUPPORT SYSTEM, COMPUTER PROGRAM, AND STORAGE MEDIUM

(71) Applicant: MITSUBISHI HEAVY INDUSTRIES, LTD., Tokyo (JP)

(72) Inventors: Eisuke Noda, Tokyo (JP); Satoshi Hanada, Tokyo (JP); Yusuke Yamada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 155 days.

(21) Appl. No.: 15/563,551

(22) PCT Filed: Mar. 25, 2016

(86) PCT No.: PCT/JP2016/059750
§ 371 (c)(1),
(2) Date: Sep. 29, 2017

(87) PCT Pub. No.: WO2016/158800
PCT Pub. Date: Oct. 6, 2016

(65) Prior Publication Data
US 2018/0080782 A1 Mar. 22, 2018

(30) Foreign Application Priority Data
Mar. 31, 2015 (JP) ................................. 2015-073941
Mar. 31, 2015 (JP) ................................. 2015-073945

(51) Int. Cl.
*B60L 9/00* (2019.01)
*G01C 21/34* (2006.01)
(Continued)

(52) U.S. Cl.
CPC ..... *G01C 21/3461* (2013.01); *G01C 21/3492* (2013.01); *G01C 21/3667* (2013.01);
(Continued)

(58) Field of Classification Search
CPC ......... G01C 21/34; G06G 7/76; H04M 11/00; B01J 49/00; H02P 9/04; B60Q 11/00; F21S 8/02; B60L 9/00; H01M 8/04
See application file for complete search history.

(56) References Cited

U.S. PATENT DOCUMENTS 8,428,802 B2 * 4/2013 Kizaki ................. B60L 3/0053
701/22
2002/0102961 A1 * 8/2002 Gibbons ............. G08G 1/0965
455/404.2
(Continued)

FOREIGN PATENT DOCUMENTS

EP 0849693 A2 6/1998
EP 2840577 A1 2/2015
(Continued)

OTHER PUBLICATIONS

Office Action in JP Application No. 2017-509936, dated Oct. 9, 2018, 7pp.
(Continued)

*Primary Examiner* — Yuri Kan
(74) *Attorney, Agent, or Firm* — Hauptman Ham, LLP

(57) ABSTRACT

To provide a route planning system including a route-status-data acquisition unit that acquires route status data indicating a status of a basic route for moving a support facility from a standby position to a predetermined position in case of emergency of an existing facility, and a generation unit that generates alternative route data indicating an alternative route for moving the support facility to the predetermined position based on the route status data.

12 Claims, 28 Drawing Sheets

(51) Int. Cl.
  *G06G 7/76* (2006.01)
  *G06Q 10/06* (2012.01)
  *G06Q 50/06* (2012.01)
  *G01C 21/36* (2006.01)
  *G06Q 10/04* (2012.01)
  *G06Q 50/26* (2012.01)

(52) U.S. Cl.
  CPC ....... *G06Q 10/047* (2013.01); *G06Q 10/0633* (2013.01); *G06Q 10/0635* (2013.01); *G06Q 10/0637* (2013.01); *G06Q 50/06* (2013.01); *G06Q 50/265* (2013.01)

(56) References Cited

U.S. PATENT DOCUMENTS

| | | | | |
|---|---|---|---|---|
| 2007/0275271 | A1* | 11/2007 | Lee | H01M 16/003 429/9 |
| 2012/0106138 | A1* | 5/2012 | Mandy | F21S 8/026 362/147 |
| 2013/0024100 | A1* | 1/2013 | Claudel | G08G 1/0116 701/117 |
| 2013/0037477 | A1* | 2/2013 | Parke | B01J 47/08 210/241 |
| 2013/0264863 | A1* | 10/2013 | McCollum | B60Q 1/305 307/9.1 |
| 2015/0318809 | A1* | 11/2015 | Mitsutani | B60L 53/16 290/40 R |

FOREIGN PATENT DOCUMENTS

| | | | | |
|---|---|---|---|---|
| GB | 2513457 | A | | 10/2014 |
| JP | 10-334078 | A | | 12/1998 |
| JP | 2000214918 | A | | 8/2000 |
| JP | 2002-156902 | A | | 5/2002 |
| JP | 2002-255465 | A | | 9/2002 |
| JP | 2003196770 | A | | 7/2003 |
| JP | 2005-18199 | A | | 1/2005 |
| JP | 2007-108885 | A | | 4/2007 |
| JP | 2008-172406 | A | | 7/2008 |
| JP | 2009-48453 | A | | 3/2009 |
| JP | 2013-88829 | A | | 5/2013 |
| JP | 2013134663 | A | | 7/2013 |
| KR | 20150106675 | A | * | 9/2015 ............. G01C 21/34 |

OTHER PUBLICATIONS

Urakawa et al., "Study on Strategy Using Road-network model for Disaster Mitigation", Theory and Application of GIS, Jul. 31, 2004, pp. 73-80, vol. 12 No. 1, GIS Association of Japan, Japan, 10pp.
Office Action for Japanese Application No. 2017-509936 dated Apr. 16, 2019; 7pp.
Written Opinion in PCT/JP2016/059750, dated Jun. 7, 2016. 17pp.
International Search Report in PCT/JP2016/059750, dated Jun. 7, 2016. 6pp.
Extended European Search Report in EP Application No. 16772681.9, dated Mar. 13, 2018. 10pp.
Office Action for European Patent Application No. 16 772 681.9 dated Oct. 23, 2019; 10pp.

* cited by examiner

FIG.21

| [SUPPLY SECUREMENT STATUS] | | | |
|---|---|---|---|
| AFFILIATION | ARTICLE | SECURED AMOUNT/ TARGET AMOUNT | EXPECTED TIME OF ARRIVAL |
| JAPAN SELF-DEFENSE FORCES | | | |
| | FUEL (GASOLINE) | ○○L/○○L | ○○:○○ |
| | DRINKING WATER | ××××L/××××L | ○○:○○ |
| | MEDICAL GOODS | ○○×set/○○△set | ××:×× |
| FIRE DEPARTMENT | | | |
| | PUMP VEHICLE FOR FIRE EXTINGUISHING | | ○○:×× |
| | POWER-SUPPLY VEHICLES | XX UNITS/YY UNITS | ○○:△△ |
| POLICE DEPARTMENT | | | |
| | PERSONNEL | ZZ PERSONS/ XX PERSONS | △△:○○ |
| LOCAL GOVERNMENT | | | |
| | WORKERS | XX PERSONS/ XX PERSONS | ××:×× |
| JAPAN COAST GUARD | | | |
| | PERSONNEL (MARITIME SECURITY) | YY PERSONS/ YY PERSONS | ××:○○ |

ROUTE PLANNING SYSTEM, ROUTE PLANNING METHOD, ARTICLE-ARRANGEMENT PLANNING SYSTEM, ARTICLE-ARRANGEMENT PLANNING METHOD, DECISION-MAKING SUPPORT SYSTEM, COMPUTER PROGRAM, AND STORAGE MEDIUM

RELATED APPLICATIONS

The present application is a National Phase of International Application Number PCT/JP2016/059750, filed Mar. 25, 2016, which claims priority to Japanese Applications Number 2015-073941, filed Mar. 31, 2015 and Number 2015-073945, filed Mar. 31, 2015.

FIELD

The present invention relates to a route planning system, a route planning method, an article-arrangement planning system, an article-arrangement planning method, a decision-making support system, a computer program, and a storage medium.

BACKGROUND

If a disaster such as a severe accident in a nuclear power generation plant occurs, a disaster response office is established in parties concerned to take measures. If a disaster occurs, there is a case where a decision-making support system is used to support decision making of the measures. Examples of a decision-making support system are disclosed in Patent Literature 1 and Patent Literature 2. An example of an image processing apparatus that transmits information at the time of occurrence of a disaster is disclosed in Patent Literature 3.

CITATION LIST

Patent Literatures

Patent Literature 1: Japanese Laid-open Patent Publication No. 2013-088829 A
Patent Literature 2: Japanese Laid-open Patent Publication No. 10-334078 A
Patent Literature 3: Japanese Laid-open Patent Publication No. 2008-172406 A

SUMMARY

Technical Problem

In a plant, various kinds of existing devices such as a pump and a power source are used. If an abnormality occurs in the existing device due to occurrence of a disaster, the existing device may be substituted by a transportable device. The transportable device is stored at a standby position in the plant. If an abnormality occurs in the existing device, the transportable device is transported from the standby position to a predetermined position for substitution through a predetermined route in the plant. If the transportable device cannot be transported quickly in an emergency such as at the time of occurrence of a disaster, the damage may spread. Further, not only in plant facilities but also in traffic facilities such as motorways or railways, or building facilities such as condominium buildings or commercial facilities, if a support facility is not transported quickly, the damage may spread.

Further, in an emergency such as occurrence of a disaster, relief supplies (articles) may be supplied to the plant from outside. If necessary and sufficient articles are not quickly arranged, sufficient support is not realized and restoration may be delayed. Also in the traffic facilities and building facilities, if necessary and sufficient articles are not quickly arranged in an emergency, restoration may be delayed.

According to an aspect of the present invention, it is an object thereof to provide a route planning system that can plan a route for a support facility appropriately, a route planning method, a computer program, and a recording medium in order to quickly transport the support facility such as the transportable device in case of an emergency. Further, according to an aspect of the present invention, it is an object thereof to provide a decision-making support system that can effectively support decision making by using data on a planned route.

According to an aspect of the present invention, it is an object thereof to provide an article-arrangement planning system that can plan arrangement of necessary and sufficient articles in an emergency, an article-arrangement planning method, a computer program, and a recording medium. Further, according to an aspect of the present invention, it is an object thereof to provide a decision-making support system that can effectively support decision making by using data on a planned article arrangement.

Solution to Problem

According to a first aspect of the present invention, a route planning system is provided and includes a route-status-data acquisition unit that acquires route status data indicating a status of a basic route through which a support facility is moved from a standby position to a predetermined position in case of emergency of an existing facility, and a generation unit that generates an alternative route data indicating an alternative route for moving the support facility to the predetermined position based on the route status data.

According to the first aspect of the present invention, when it is determined that it is difficult to move a support facility quickly based on the route status data of the basic route, the alternative route data is generated. Therefore, route planning of the support facility is appropriately performed.

In the first aspect of the present invention, the existing facility may include an existing device, and the support facility may include a transportable device that substitutes for the existing device.

Accordingly, in case of emergency of the existing facility, when it is determined that it is difficult to move a transportable device quickly, route planning of the transportable device is appropriately performed based on the alternative route data displayed on a display device.

In the first aspect of the present invention, an area-status-data acquisition unit that acquire area status data indicating a status of an area in which the existing facility is present may be provided. The generation unit may generate the alternative route data by deciding the predetermined position based on the area status data.

Accordingly, even if the area status is different from the normal status due to, for example, a disaster, route planning of a support facility is appropriately performed based on the area status data. Further, the state of the support facility and the specification of the support facility can be displayed on the display device. The state of the support facility includes an abnormal state (a failure state) of the support facility, a normal state of the support facility, a restoration time until the support facility in an abnormal state is restored, and a connection state between the support facility and another facility (whether a connection work is being performed or not). When the support facility includes a transportable power source, the specification of the support facility includes power supply capacity. When the support facility includes a transportable pump, the specification of the support facility includes water supply capacity (liquid supply capacity).

In the first aspect of the present invention, the route status data may include one or both of damage data indicating a damage status at a specific position in the basic route and restoration data indicating a restoration status of damage.

Accordingly, when the basic route is damaged, the route planning of a support facility is appropriately performed based on the alternative route data. When the basic route has been restored, the route planning of the support facility is appropriately performed based on at least one of the basic route data and the alternative route data.

In the first aspect of the present invention, the route status data may include damage data indicating a damage status at a specific position in the basic route, and the generation unit may be able to generate construction-machine route data indicating a construction machine route, through which a construction machine for restoring the specific position is moved to the specific position, based on the route status data.

Accordingly, not only the route planning of a support facility but also the route planning of a construction machine can be appropriately performed, and the construction machine can be quickly moved to the specific position where damage has occurred in the basic route, thereby enabling to contribute to early restoration.

In the first aspect of the present invention, the route status data may include damage data indicating a damage status at a specific position in the basic route, and a determination unit that determines whether the support facility can pass through the specific position based on the damage data may be provided, and the generation unit may generate the alternative route data when it is determined that the support facility cannot pass through the specific position.

Accordingly, the route planning of the support facility is appropriately performed in accordance with the status of the specific position where the damage has occurred in the basic route.

In the first aspect of the present invention, an estimation unit that estimates one or both of a moving time required for the support facility passing through the alternative route to arrive at the predetermined position and a moving distance may be provided.

Accordingly, the route planning of the support facility is appropriately performed based on one or both of the estimated moving time and moving distance.

In the first aspect of the present invention, the route status data may include damage data indicating a damage status at a specific position in the basic route, and the estimation unit may estimate a moving time required for the support facility passing through the basic route to arrive at the predetermined position, taking into consideration an expected restoration time required for restoring the specific position.

Accordingly, the moving time in the case where the support facility passes through the basic route and the moving time in the case where the support facility passes through the alternative route can be compared based on the expected restoration time of the basic route. Based on a comparison result, the route planning of the support facility is appropriately performed.

In the first aspect of the present invention, a display control unit that causes a display device to display the alternative route data may be provided. The display control unit may cause the display device to display one or both of moving time data indicating the moving time and moving distance data indicating the moving distance, estimated by the estimation unit.

Accordingly, the route planning of the support facility is appropriately performed based on one or both of the moving time data and the moving distance data displayed on the display device.

In the first aspect of the present invention, a database unit that holds the alternative route data generated by the generation unit may be provided.

Accordingly, the alternative route data is accumulated, thereby enabling to contribute to appropriate execution of the route planning in case of future emergency.

In the first aspect of the present invention, a position-data acquisition unit that acquires position data indicating a position of the support facility may be provided, and the display control unit may cause the display device to display the position data.

Accordingly, because the position of the support facility is recognized on a real-time basis via the display device, the route planning of the support facility is appropriately performed.

In the first aspect of the present invention, the route status data may be wirelessly transmitted to a mobile terminal mounted on the support facility.

Accordingly, a worker who moves a support facility can recognize the route status data on a real-time basis via a mobile terminal.

In the first aspect of the present invention, the route status data may include image data of the basic route.

Accordingly, the status of the basic route is smoothly recognized. The image data can be still image data or moving image data (video data).

In the first aspect of the present invention, the display device may display the alternative route data together with map data.

Accordingly, it can be smoothly recognized which route of a plurality of routes a support facility passes to move to a predetermined position.

In the first aspect of the present invention, the route status data may include audio data, and an audio-output control unit that causes an audio output device to output the audio data may be provided.

Accordingly, the status of the basic route is smoothly recognized via hearing sense.

In the first aspect of the present invention, a priority-data acquisition unit that acquires priority data indicating at least one of a moving time required for the support facility to arrive at the predetermined position, a moving distance of the support facility to the predetermined position, a gradient of a road surface on which the support facility travels until arriving at the predetermined position, a curvature of a road surface on which the support facility travels until arriving at the predetermined position, and a width of the road surface on which the support facility travels until arriving at the predetermined position may be provided. The generation unit may generate the alternative route data based on the priority data.

Accordingly, by inputting the priority data based on, for example, the structure or the performance of a support facility, optimum route planning is performed.

According to a second aspect of the present invention, a decision-making support system that supports decision making of measures in case of emergency, is provided and includes the route planning system according to the first aspect, and an information management unit that shares abnormal condition data including the alternative route data required in case of emergency via a network.

According to the second aspect of the present invention, because the abnormal condition data including the alternative route data is shared, decision making can be effectively supported by using the abnormal condition data.

According to a third aspect of the present invention, an article-arrangement planning system is provided and includes a display control unit that causes a display device to display article data indicating articles to be arranged in case of emergency, and an arrangement-status-data acquisition unit that acquires arrangement status data indicating each arrangement status of the plurality of articles. The arrangement status data includes target amount data indicating a target amount of the articles and expected arrival time data indicating an expected time of arrival of the articles, and the display control unit causes the display device to display the article data in association with the arrangement status data.

According to the third aspect of the present invention, the display device displays article data in association with arrangement status data. Therefore, planning for quickly arranging necessary and sufficient articles can be performed based on a display result on the display device.

In the third aspect of the present invention, the arrangement status data may include actual amount data indicating a secured amount of arranged articles.

Accordingly, because the display device displays the article data in association with actual amount data, a secured amount of arranged articles can be ascertained based on a display result on the display device.

In the third aspect of the present invention, the arrangement status data may include position data indicating a position of transport means that transports the articles.

Accordingly, planning for quickly arranging necessary and sufficient articles can be performed based on a display result including position data on the display device. The transport means includes not only vehicles but also railways, aircrafts, and marine vessels, for example.

In the third aspect of the present invention, the arrangement status data may include traffic data indicating a status of a transport route of the transport means and planned data indicating a planned route of the transport means.

Accordingly, because the display device displays the article data in association with traffic data or planned route data, planning for quickly arranging necessary and sufficient articles can be performed based on a display result on the display device. The traffic data includes route data indicating the status of a route through which the transport means passes. The route data includes a route map (a road map), traffic congestion information, disaster information of roads, a railway failure, and the like.

In the third aspect of the present invention, a determination unit that determines whether a specific one of the articles supplied from a first supply source arrives at the expected time, and an instruction unit that outputs an instruction signal so that the specific article is supplied from a second supply source, when it is determined that the specific article does not arrive at the expected time, may be provided.

Accordingly, necessary articles can be obtained quickly.

In the third aspect of the present invention, a transmission unit that outputs request data for requesting arrangement of the articles, and a reception unit that receives the request data via a network, may be provided. The articles may be arranged based on the request data received by the reception unit, and arrangement status data indicating an arrangement status of the articles may be transmitted to the arrangement-status-data acquisition unit via a network.

Accordingly, the arrangement status of articles can be recognized via a network, and arrangement planning of necessary and sufficient articles can be performed.

According to a fourth aspect of the present invention, a decision-making support system that supports decision making of measures in case of emergency, is provided and includes the article-arrangement planning system according to the third aspect, and an information management unit that shares abnormal condition data including the arrangement status data required in case of emergency via a network.

According to the fourth aspect of the present invention, because abnormal condition data including arrangement status data is shared by the parties concerned, the abnormal condition data can be used to support decision making effectively.

According to a fifth aspect of the present invention, a route planning method is provided and includes acquiring route status data indicating a status of a basic route for moving a support facility from a standby position to a predetermined position in case of emergency of an existing facility, generating alternative route data indicating an alternative route for moving the support facility to the predetermined position based on the route status data, and causing a display device to display the alternative route data.

According to a sixth aspect of the present invention, an article-arrangement planning method is provided and includes causing a display device to display article data indicating articles to be arranged in case of emergency, and acquiring arrangement status data indicating an arrangement status of each of the plurality of articles. The arrangement status data includes target amount data indicating a target amount of the articles and expected arrival time data indicating an expected time of arrival of the articles, and the display device is caused to display the article data in association with the arrangement status data.

According to a seventh aspect of the present invention, a computer program is provided and causes a computer to execute acquiring route status data indicating a status of a basic route for moving a support facility from a standby position to a predetermined position in case of emergency of an existing facility, generating alternative route data indicating an alternative route for moving the support facility to the predetermined position based on the route status data, and causing a display device to display the alternative route data.

According to an eighth aspect of the present invention, a computer program is provided and causes a computer to execute causing a display device to display article data indicating articles to be arranged in case of emergency, and acquiring arrangement status data indicating an arrangement status of each of the plurality of articles. The arrangement status data includes target amount data indicating a target amount of the articles and expected arrival time data indicating an expected time of arrival of the articles, and the display device is caused to display the article data in association with the arrangement status data.

According to a ninth aspect of the present invention, a recording medium having recorded therein a computer program is provided and causes a computer to execute acquiring route status data indicating a status of a basic route for moving a support facility from a standby position to a predetermined position in case of emergency of an existing facility, generating alternative route data indicating an alternative route for moving the support facility to the predetermined position based on the route status data, and causing a display device to display the alternative route data.

According to a tenth aspect of the present invention, a recording medium having recorded therein a computer program is provided and causes a computer to execute causing a display device to display article data indicating articles to be arranged in case of emergency, and acquiring arrangement status data indicating an arrangement status of each of the plurality of articles. The arrangement status data includes target amount data indicating a target amount of the articles and expected arrival time data indicating an expected time of arrival of the articles, and the display device is caused to display the article data in association with the arrangement status data.

Advantageous Effects of Invention

According to the aspect of the present invention, a route planning system that can plan a route for a support facility appropriately, a route planning method, a computer program, and a recording medium are provided so that the support facility such as a transportable device can be quickly moved in case of emergency. Further, according to the aspect of the present invention, a decision-making support system that can effectively support decision making by using data on a planned route is provided.

According to the aspect of the present invention, an article-arrangement planning system that can plan arrangement of necessary and sufficient articles in case of emergency, an article-arrangement planning method, a computer program, and a recording medium are provided. Further, according to the aspect of the present invention, a decision-making support system that can effectively support decision making by using data on a planned article arrangement is provided.

BRIEF DESCRIPTION OF DRAWINGS

FIG. 21 is a diagram illustrating an example of a display device according to the fifth embodiment.

DESCRIPTION OF EMBODIMENTS

Embodiments of the present invention will be described below with reference to the accompanying drawings; however, the present invention is not limited thereto. Constituent elements in the respective embodiments described below can be combined with each other as appropriated. In addition, some of the constituent elements may not be used in certain embodiments.

First Embodiment

Figure 1:
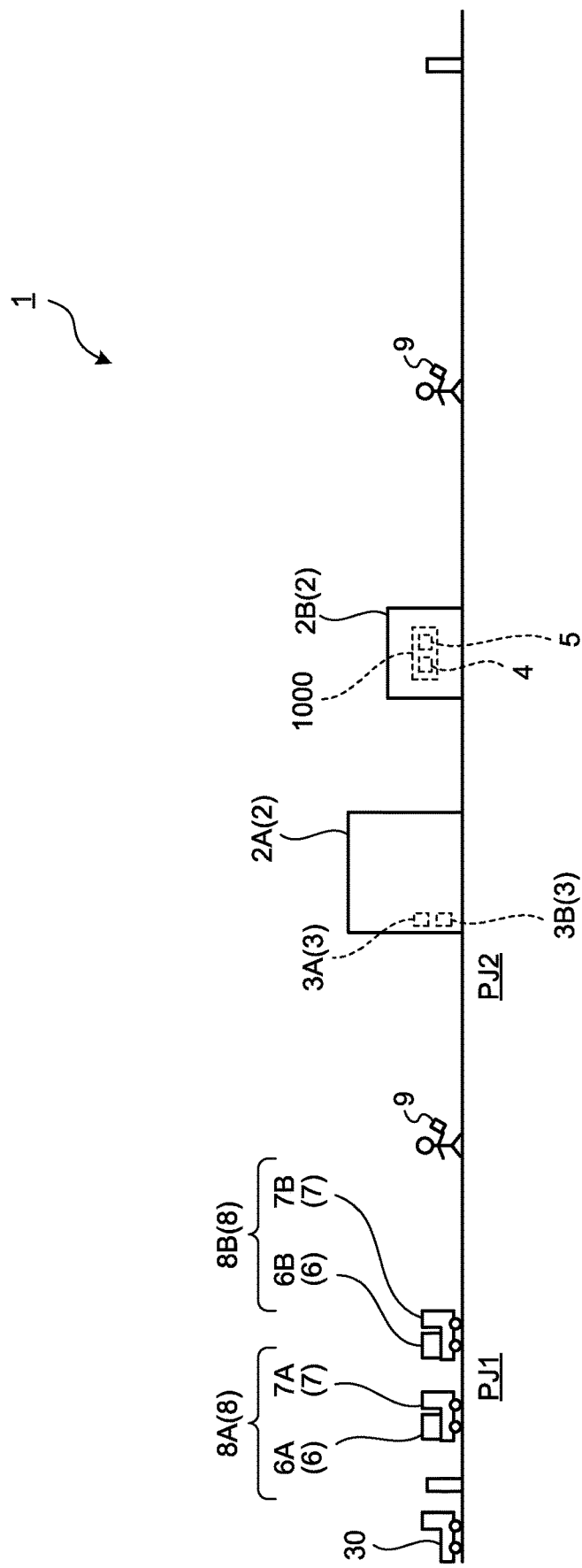
FIG. 1 is a diagram schematically illustrating an example of a plant according to a first embodiment.

A first embodiment is described. FIG. 1 is a diagram schematically illustrating an example of a plant 1 according to the present embodiment. In the present embodiment, the plant 1 is a nuclear power generation plant that generates power by using nuclear power. The plant 1 includes a nuclear reactor system including a nuclear reactor, and a turbine system including a steam turbine and a power generator. The nuclear reactor is a light-water reactor using light water as a reactor core coolant and a neutron moderator. The nuclear reactor system includes a primary coolant system in which primary cooling water circulates. The turbine system includes a secondary coolant system in which secondary cooling water circulates. The nuclear reactor system (primary coolant system) and the turbine system (secondary coolant system) are separated by a steam generator. The nuclear reactor system includes a pressurized water reactor (PWR) that generates high-temperature and high-pressure primary cooling water (hot water), and supplies the hot water to the steam generator to generate steam of the secondary cooling water by performing heat exchange between the primary cooling water (hot water) and the secondary cooling water in the steam generator. In the present embodiment, the nuclear power generation plant is a pressurized-water nuclear power generation plant.

The nuclear reactor system heats the primary cooling water by thermal energy generated by a nucleus reaction in a state in which the primary cooling water is pressurized to increase a boiling point of the primary cooling water. The nuclear reactor system generates high-temperature and high-pressure hot water by heating the pressurized water, and supplies the hot water to the steam generator. In the nuclear reactor system, the primary cooling water is heated so as not to be boiled. The turbine system converts the secondary cooling water to high-temperature and high-pressure steam by performing heat exchange between the secondary cooling water and the primary cooling water (hot water). The steam turbine is operated by the steam. The power generator is operated by the operation of the steam turbine to generate power.

A plurality of constructions 2 are placed in a property of the plant 1. The construction 2 includes a first construction (a building) 2A in which the nuclear reactor system and the turbine system are placed, and a second construction (an administration building) 2B in which at least a part of a management system 1000 that manages the plant 1 is placed.

The nuclear reactor system and the turbine system include a plurality of existing devices 3 respectively being an existing facility. The existing device 3 includes an existing pump 3A and an existing power source 3B. The existing power source 3B includes an internal power source, an external power source, an emergency power source (an emergency power generator), and a battery power source. The existing device 3 includes an electric device that is operated by the supplied power. The electric device includes, for example, the existing pump 3A.

The management system 1000 manages the plant 1. The management system 1000 includes a computer system 4 and a display device 5. The computer system 4 and the display device 5 are placed in the second construction 2B.

A transportable device 6 being a support facility is provided in the plant 1. The transportable device 6 is supported by a vehicle 7. The transportable device 6 is carried by the vehicle 7. In the present embodiment, the transportable device 6 includes a transportable pump 6A and a transportable power source 6B. The vehicle 7 includes a vehicle 7A that carries the transportable pump 6A and a vehicle 7B that carries the transportable power source 6B.

In the following descriptions, the transportable device 6 and the vehicle 7 together are appropriately referred to as "device vehicle 8", the transportable pump 6A and the vehicle 7A together are appropriately referred to as "pump vehicle 8A", and the transportable power source 6B and the vehicle 7B together are appropriately referred to as "power source vehicle 8B". The device vehicle 8 includes the pump vehicle 8A and the power source vehicle 8B.

In case of emergency of the existing device 3, the transportable device 6 supports the existing device 3. In the present embodiment, when the existing device 3 has an abnormality, the existing device 3 is substituted by the transportable device 6. When the existing device 3 is normal, the transportable device 6 (the device vehicle 8) is placed (stored) at a standby position PJ1 in the plant 1. When the existing device 3 has an abnormality, the transportable device 6 is moved from the standby position PJ1 to a predetermined position PJ2 for substitution to be operated instead of the existing device 3.

In the plant 1, a plurality of workers work. Each worker has a mobile terminal 9. The mobile terminal 9 includes a portable computer such as a smartphone or a tablet-type personal computer.

Figure 2:
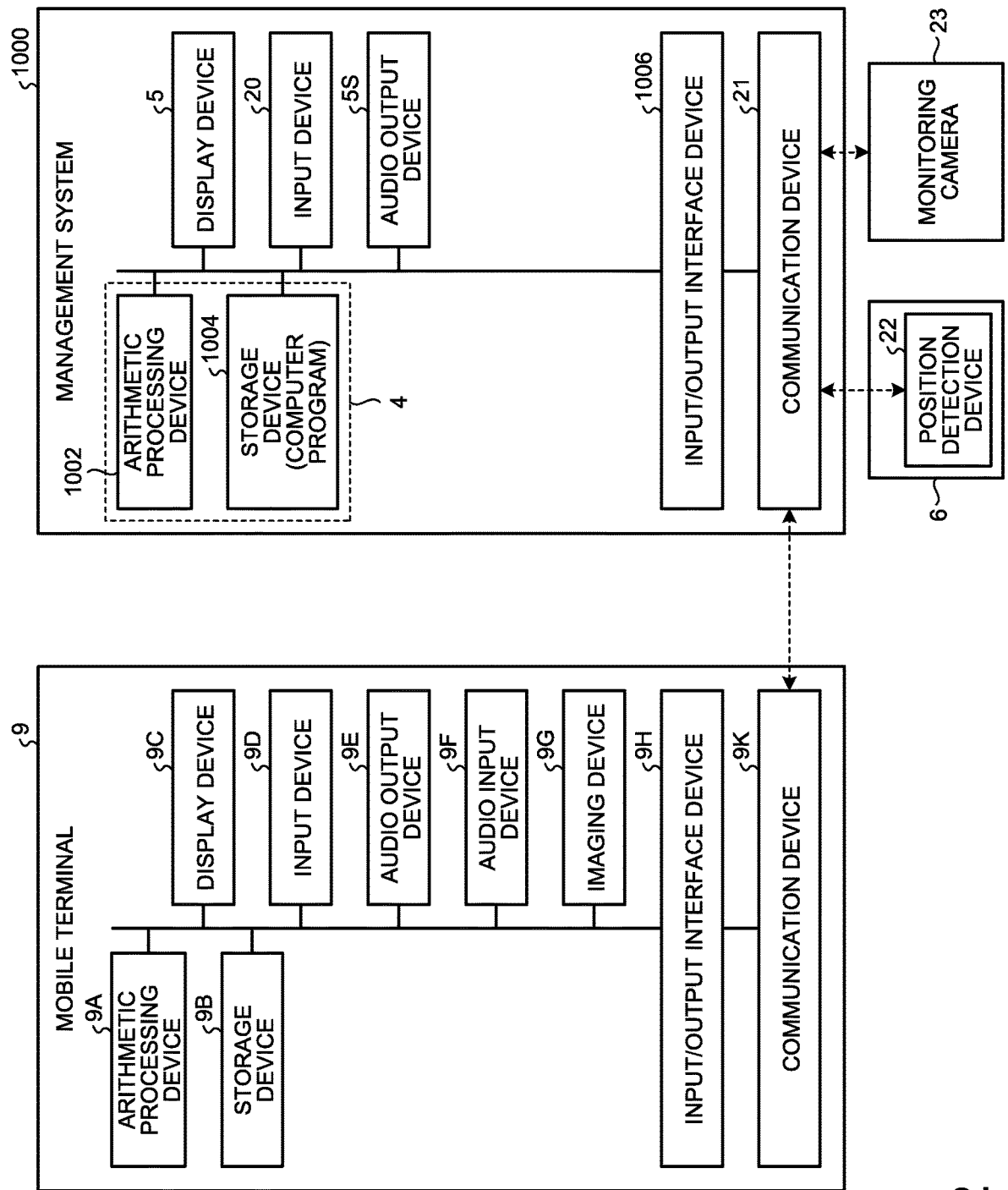
FIG. 2 is a block diagram illustrating an example of a hardware configuration of a mobile terminal and a management system according to the first embodiment.

FIG. 2 is a block diagram illustrating a hardware configuration of the mobile terminal 9 and the management system 1000 according to the present embodiment.

The mobile terminal 9 includes an arithmetic processing device 9A, a storage device 9B, a display device 9C, an input device 9D, an audio output device 9E, an audio input device 9F, an imaging device 9G, an input/output interface device 9H, and a communication device 9K.

The arithmetic processing device 9A includes a microprocessor such as a CPU (Central Processing Unit). The storage device 9B includes a memory such as a ROM (Read Only Memory) or a RAM (Random Access Memory) and a storage.

The display device 9C includes a flat panel display such as a liquid crystal display (LCD) or an organic electroluminescence display (OLED). The input device 9D is operated to generate input data. In the present embodiment, the input device 9D includes a touch sensor provided on a display screen of the display device 9C. The display device 9C includes a touch panel.

The audio output device 9E includes a speaker. The audio input device 9F includes a microphone.

The imaging device 9G includes a video camera function capable of acquiring moving image data of an object, and a still camera function capable of acquiring still image data of the object. The imaging device 9G includes an optical system and an image pickup device that acquires imaging data of the object via the optical system. The image pickup device includes a CCD (Charge Coupled Device) image sensor, or a CMOS (Complementary Metal Oxide Semiconductor) image sensor.

The input/output interface device 9H performs data communication among the arithmetic processing device 9A, the storage device 9B, the display device 9C, the input device 9D, the audio output device 9E, the audio input device 9F, the imaging device 9G, and the communication device 9K.

The communication device 9K performs data communication wirelessly with the management system 1000. The communication device 9K performs data communication with the management system 1000 by using at least one of a mobile phone communication network, the Internet connection, and a local area network.

The management apparatus 1000 includes the computer system 4. The management system 1000 includes an arithmetic processing device 1002, a storage device 1004, the display device 5, an input device 20, an audio output device 5S, an input/output interface device 1006, and a communication device 21.

The arithmetic processing device 1002 includes a microprocessor such as a CPU. The storage device 1004 includes a memory such as a ROM or a RAM and a storage. The arithmetic processing device 1002 performs arithmetic processing according to a computer program stored in the storage device 1004.

The display device 5 includes a flat panel display. The input device 20 is operated to generate input data. The input device 20 includes at least one of a keyboard and a mouse. The input device 20 can include the touch sensor provided on the display screen of the display device 5. The audio output device 5S includes a speaker.

The input/output interface device 1006 performs data communication among the arithmetic processing device 1002, the storage device 1004, the display device 5, the input device 20, the audio output device 5S, and the communication device 21.

The communication device 21 performs data communication wirelessly with the mobile terminal 9. The communication device 21 performs data communication with the mobile terminal 9 by using at least one of the mobile phone communication network, the Internet connection, and the local area network.

The mobile terminal 9 and the management system 1000 can perform data communication in a wired manner. The management system 1000 can perform data communication with a position detection device 22 provided in the transportable device 6 and a monitoring camera 23 installed in the plant 1.

Figure 3:
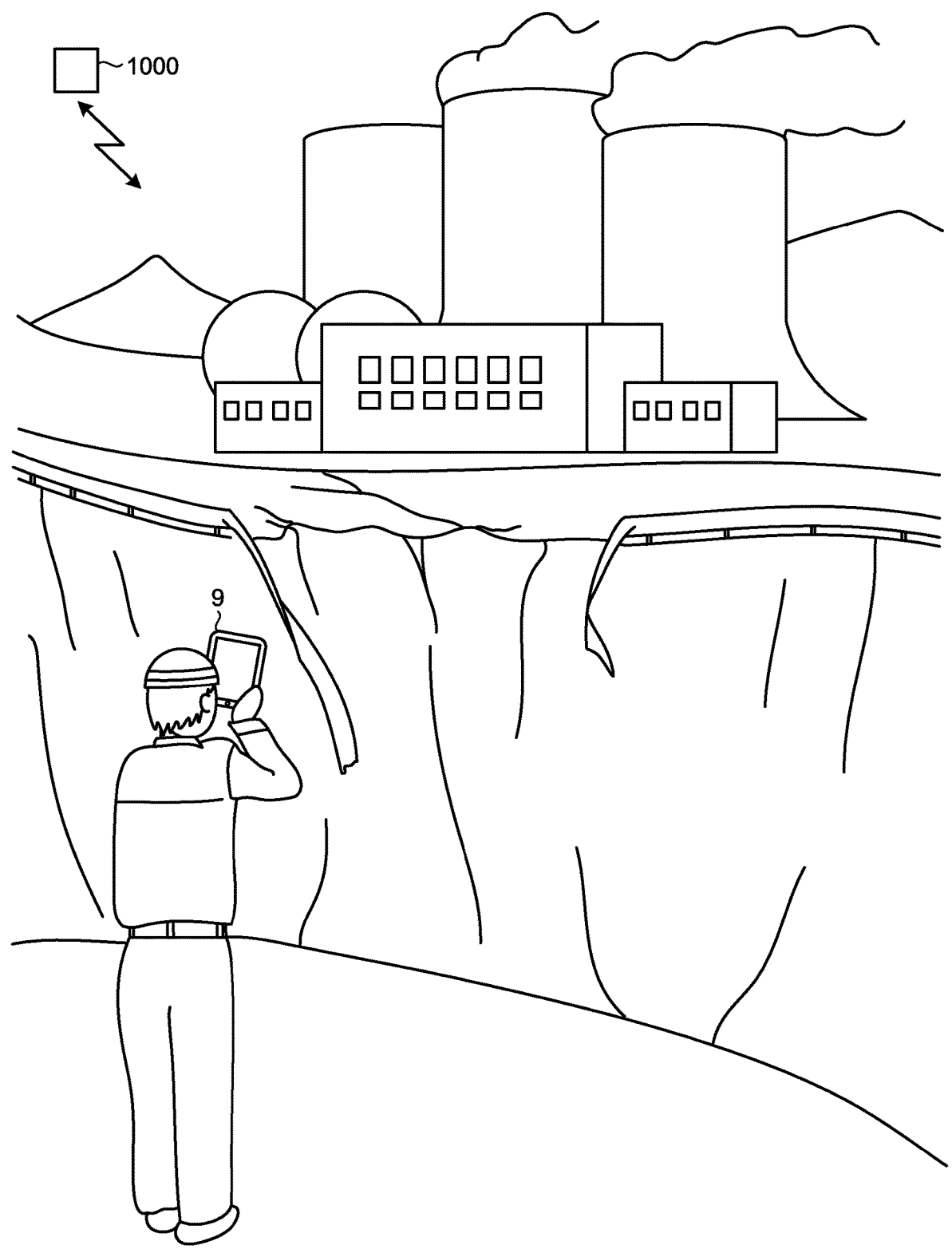
FIG. 3 is a diagram illustrating an example of the mobile terminal according to the first embodiment.

FIG. 3 is a diagram illustrating an example of the mobile terminal 9 according to the present embodiment. As illustrated in FIG. 3, a worker can acquire images or videos (moving images) at various positions (places) in the plant 1 by using a camera of the mobile terminal 9. Further, the worker can acquire sound in various places by using the audio input device 9F of the mobile terminal 9. The worker can acquire images of a track (a road) provided in the property of the plant 1 by using the imaging device 9G. The worker can acquire images inside of the construction 2 by using the imaging device 9G. The image of the plant 1 acquired by the imaging device 9G of the mobile terminal 9 is wirelessly transmitted to the management system 1000.

Figure 4:
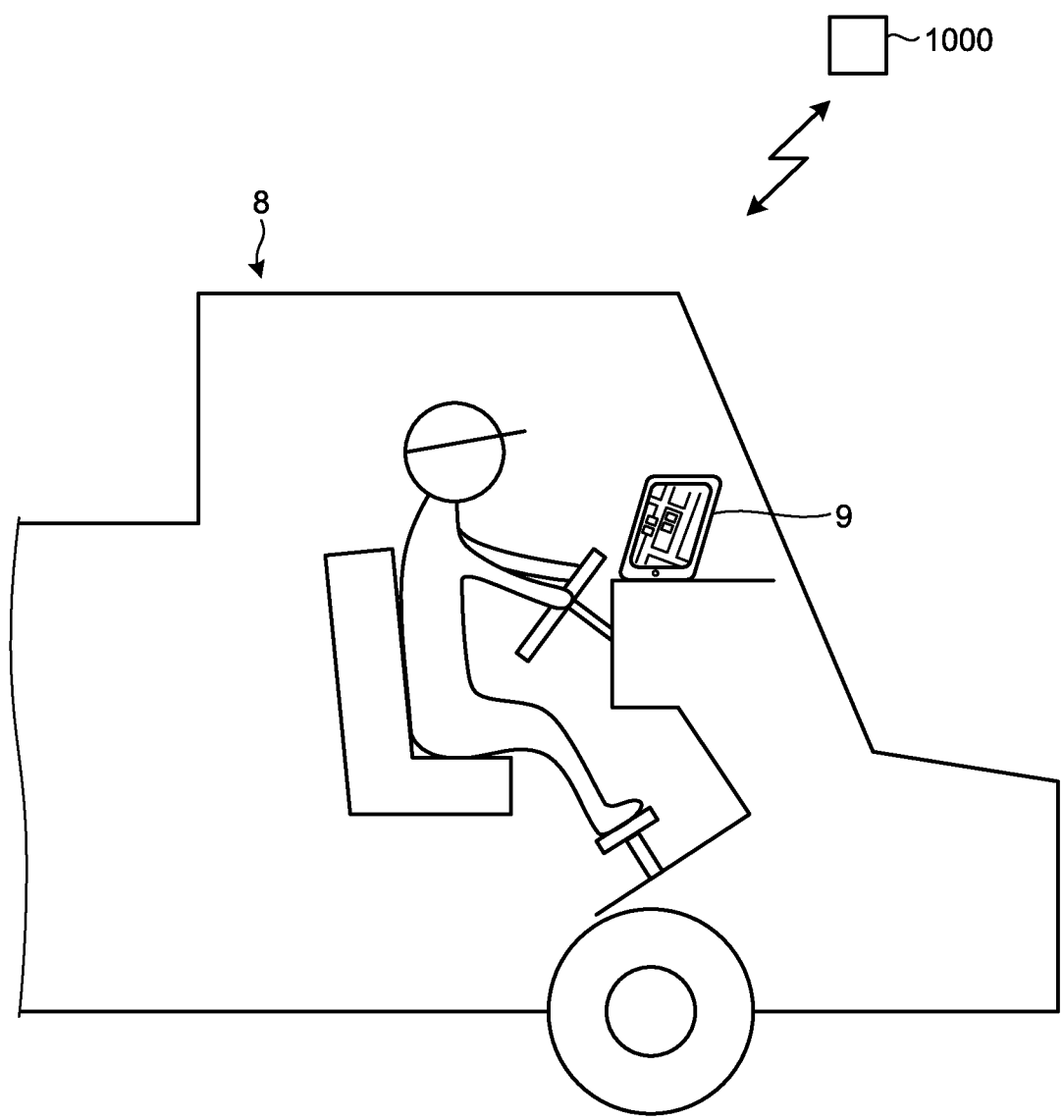
FIG. 4 is a diagram illustrating an example of the mobile terminal according to the first embodiment.

FIG. 4 is a diagram illustrating an example of the mobile terminal 9 according to the present embodiment. As illustrated in FIG. 4, the device vehicle 8 (the vehicle 7) is operated (driven) by a worker. The worker can drive the device vehicle 8 while watching the display device 9C of the mobile terminal 9. The data transmitted from the management system 1000 to the mobile terminal 9 is displayed on the display device 9C of the mobile terminal 9. The worker can drive the device vehicle 8 while watching the data displayed on the display device 9C of the mobile terminal 9. Further, the worker can drive the device vehicle 8 by using a navigation function of the mobile terminal 9. The navigation function of the mobile terminal 9 includes navigation by voice, and navigation by an image.

Figure 5:
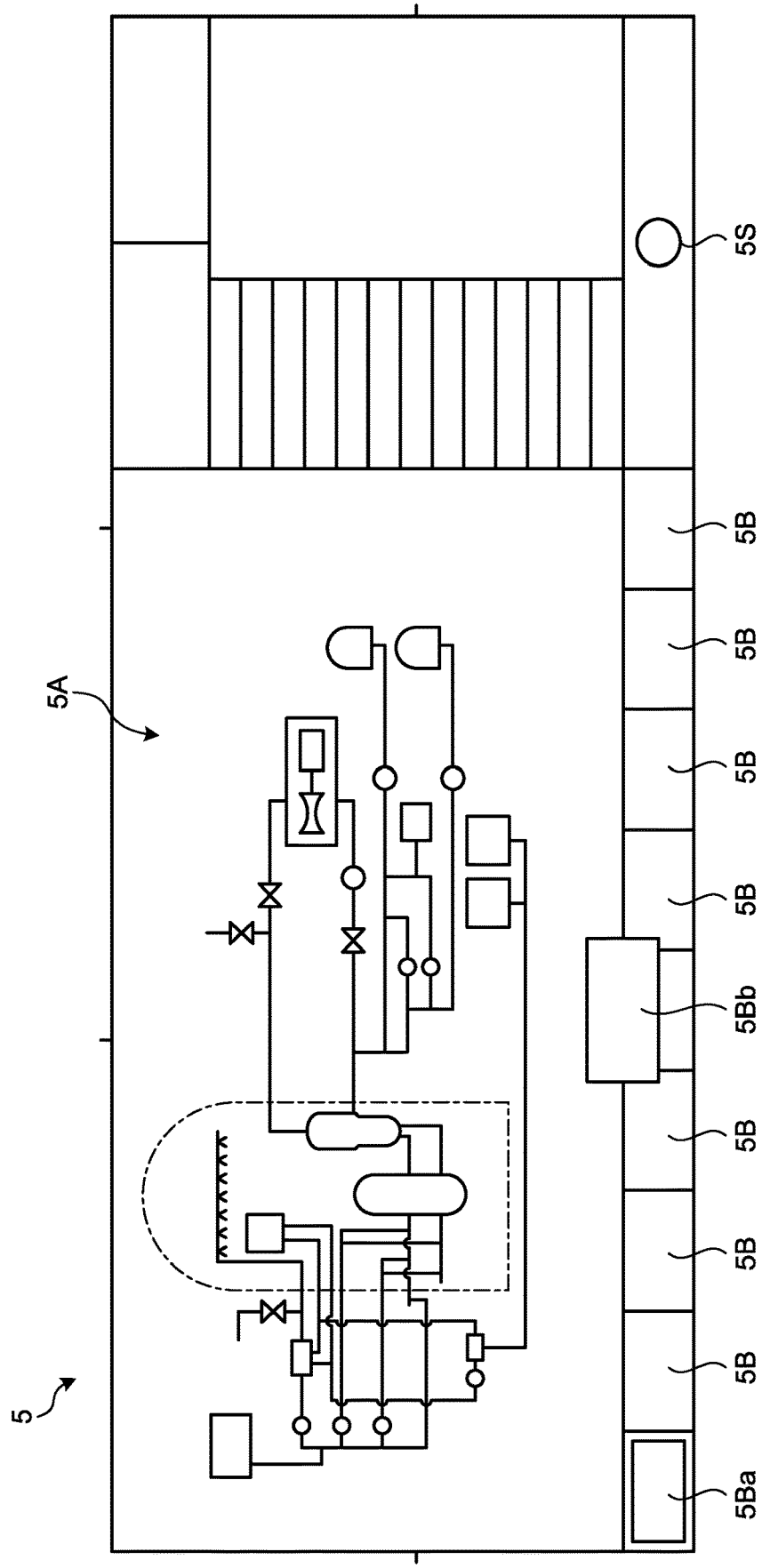
FIG. 5 is a diagram illustrating an example of a display device according to the first embodiment.

FIG. 5 is a diagram illustrating an example of the display device 5 of the management system 1000 according to the present embodiment. In the present embodiment, the display device 5 includes a touch panel. A worker can operate a screen displayed on the display device 5 by touching the touch sensor provided on the display screen of the display device 5. The worker can input an input signal (an operation signal) by touching the touch sensor of the display device 5.

In the present embodiment, the display device 5 includes a plurality of combined touch panels. In the present embodiment, two wide touch panels are placed vertically, and three horizontally. That is, in the present embodiment, the display device 5 includes six combined touch panels. The display device 5 includes a six-surface display and a large set of touch sensors over the six surfaces.

The display device 5 can display a main screen 5A and a sub-screen 5B. A plurality of main screens 5A can be displayed on a main screen area in which the main screen 5A is displayed. The sub-screen 5B is placed below the main screen 5A. The main screen 5A can display the display data input to the display device 5 by using at least one of an image, a numerical value, and characters. In an example illustrated in FIG. 5, display data indicating a coolant system and a power source system of the plant 1 is displayed on the main screen 5A. The sub-screen 5B is provided in plural. Each of the sub-screens 5B can display the display data input to the display device 5 by using at least one of an image, a numerical value, and characters. When a worker touches a specific sub-screen 5B of the sub-screens 5B, the display data displayed on the main screen 5A is switched to the display data on the specific sub-screen 5B. The display data of the touched specific sub-screen 5B is displayed on the main screen 5A. Further, arbitrarily selected ones of the main screen 5A and the sub-screen 5B can be switched over.

The display device 5 can highlight a specific sub-screen 5B of the sub-screens 5B. For example, the priority (the degree of importance) of the display data is set to three stages. A sub-screen 5B (5Bb) that displays first-priority display data having the highest priority is highlighted by pop-up or a display having movement. A sub-screen 5B (5Ba) that displays second-priority display data having the highest priority next to the first-priority display data is highlighted by being displayed with a colored frame. The sub-screen 5B (5Ba) can be highlighted by being displayed with a flash-displayed frame. Sub-screens 5B that display third-priority display data having the lowest priority are not highlighted.

The display device 5 has the audio output device 5S that outputs audio data. The audio output device 5S includes a speaker. The display device 5 can generate sound by using the audio output device 5S.

Figure 6:
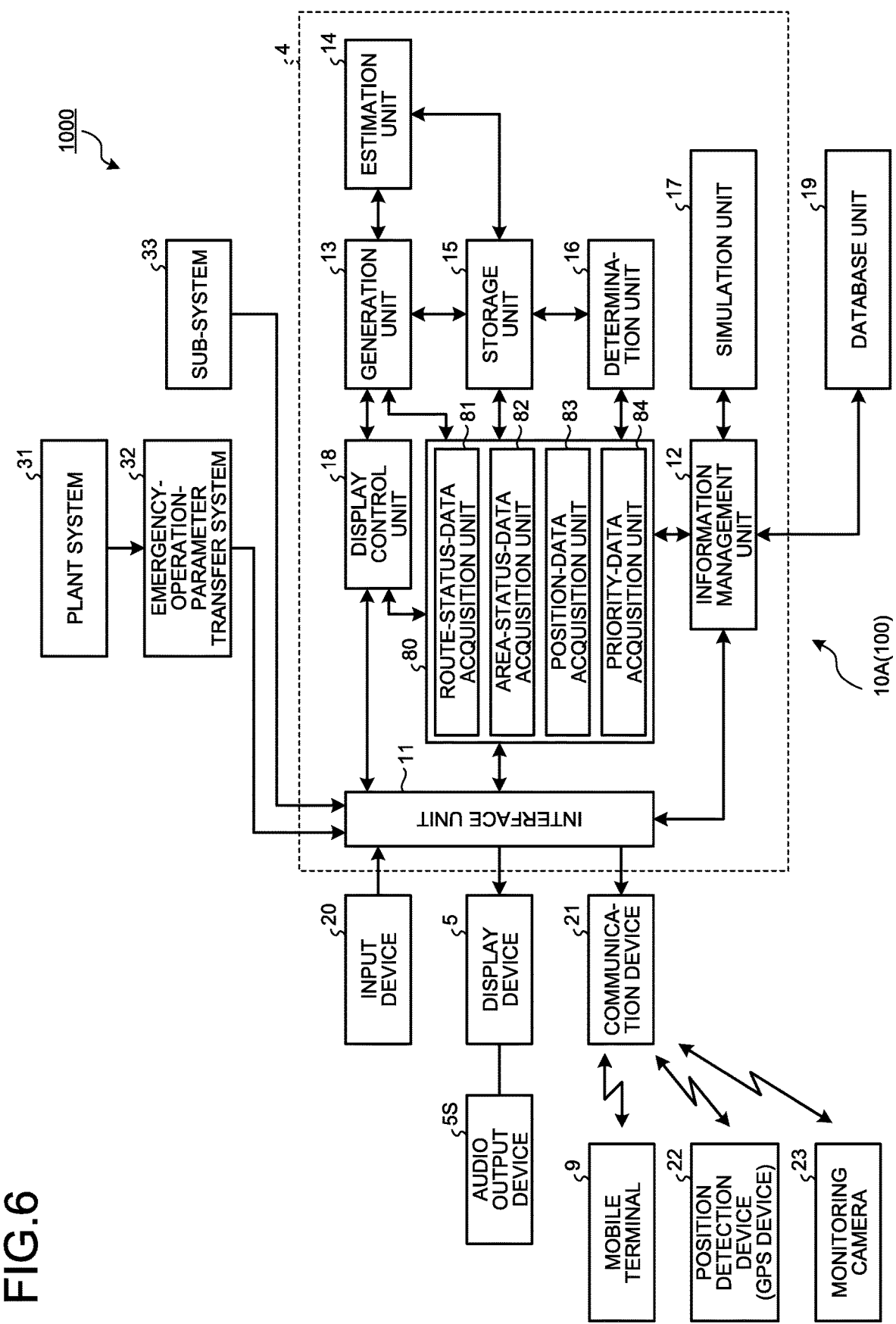
FIG. 6 is a functional block diagram illustrating an example of the management system according to the first embodiment.

Next, an example of the management system 1000 according to the present embodiment is described. FIG. 6 is a functional block diagram illustrating an example of the management system 1000 according to the present embodiment. As illustrated in FIG. 6, the management system 1000 includes the computer system 4 and the display device 5.

In the present embodiment, the management system 1000 includes a route planning system 10A that plans the route of the device vehicle 8 (the transportable device 6) in the plant 1. The management system 1000 also includes a decision-making support system 100 that supports decision making of measures against various events in case of emergency (in case of abnormal conditions) such as occurrence of a disaster. The functions of the route planning system 10A are exerted by the arithmetic processing device 1002 of the computer system 4 and a computer program stored in the storage device 1004.

If there is an abnormality in the existing device 3 due to occurrence of a disaster, the route planning system 10A plans a route for moving the transportable device 6 from the standby position PJ1 to the predetermined position PJ2 in order to substitute the transportable device 6 for the existing device 3 in the plant 1.

A route La for moving the transportable device 6 from the standby position PJ1 to the predetermined position PJ2 in the plant 1 has been decided beforehand. The route La through which the transportable device 6 moves is manualized. A worker drives the device vehicle 8 (the vehicle 7) to pass through the predetermined route La.

In the following descriptions, the route La for moving the transportable device 6 from the standby position PJ1 to the predetermined position PJ2 in the plant 1 in order to substitute the transportable device 6 for the existing device 3 in the plant 1 is appropriately referred to as "basic route La".

There is a possibility that the transportable device 6 cannot pass through the basic route La due to occurrence of a disaster. For example, a part of the basic route La may be blocked due to an earthquake disaster or a typhoon disaster.

The route planning system 10A plans an alternative route Lb for moving the transportable device 6 to the predetermined position PJ2, when such a situation occurs that the transportable device 6 cannot pass through the basic route La.

The computer system 4 of the management system 1000 includes an interface unit 11, a data acquisition unit 80, an information management unit 12, a generation unit 13, an estimation unit 14, a storage unit 15, a determination unit 16, a simulation unit 17, and a display control unit 18.

The functions of the interface unit 11 are exerted by the input/output interface device 1006. The functions of the storage unit 15 are exerted by the storage device 1004. The functions of the data acquisition unit 80, the information management unit 12, the generation unit 13, the estimation unit 14, the determination unit 16, the simulation unit 17, and the display control unit 18 are exerted by the arithmetic processing device 1002.

The management system 1000 includes a database unit 19 connected to the computer system 4, the input device 20 connected to the computer system 4, the display device 5 connected to the computer system 4, and the communication device 21 capable of communicating with the mobile terminal 9, the position detection device 22, and the monitoring camera 23. The communication device 21 can be a wireless communication device or a wired communication device.

The input device 20 includes at least one of a keyboard, a mouse, a microphone, and a camera, to generate an input signal (an operation signal) by being operated by a worker. The input device 20 can be provided in plural. When the display device 5 includes a touch panel, the input device 20 includes a display unit of the display device 5. The input signal generated by operating the input device 20 is supplied to the interface unit 11.

The position detection device 22 detects the position of the transportable device 6 (the device vehicle 8) to output position data indicating the position of the transportable device 6. In the present embodiment, the position detection device 22 includes a GPS (Global Positioning System) device. A GPS receiver is mounted on the device vehicle 8. The position detection device 22 includes the GPS receiver mounted on the device vehicle 8. The position of the transportable device 6 (the device vehicle 8) in a global coordinate system is detected by the position detection device 22. Position data indicating the position of the transportable device 6 detected by the position detection device 22 is supplied to the interface unit 11 via the communication device 21. The position data detected by the position detection device 22 can be temporarily stored and supplied to the interface unit 11 connected in a wired manner.

The monitoring camera 23 is installed at a plurality of positions in the plant 1. The image data acquired by the monitoring camera 23 is supplied to the interface unit 11 via the communication device 21.

The mobile terminal 9 and the computer system 4 can be connected to each other in a wired or wireless manner. Data communication can be performed in a state in which the mobile terminal 9 and the computer system 4 are connected to each other in a wired manner. The position detection device 22 and the computer system 4 can be connected in a wired or wireless manner. Data communication can be performed in a state in which the position detection device 22 and the computer system 4 are connected to each other in a wired manner. The monitoring camera 23 and the computer system 4 can be connected to each other in a wired manner.

The interface unit 11 acquires data supplied from an external device of the computer system 4. Further, the interface unit 11 supplies data to the external device from the computer system 4.

The data acquisition unit 80 includes a route-status-data acquisition unit 81 that acquires route status data indicating a status of the basic route La, an area-status-data acquisition unit 82 that acquires area status data indicating a status of the area in which the transportable device 6 is installed for substitution for the existing device 3, a position-data acquisition unit 83 that acquires position data indicating the position of the transportable device 6, and a priority-data acquisition unit 84 that acquires priority data.

The route-status-data acquisition unit 81 acquires route status data indicating the status of the basic route La. The route status data includes one or both of damage data indicating a damage status at a specific position in the basic route La and restoration data indicating a restoration status of the damage. For example, a worker holding the mobile terminal 9 moves to the specific position in the basic route La. Image data indicating the damage status at the specific position in the basic route La or the restoration status of the damage is acquired by using the imaging device 9G of the mobile terminal 9. The route status data including the image data of the basic route La is supplied from the mobile terminal 9 to the route-status-data acquisition unit 81 via the communication device 21 and the interface unit 11.

Audio data indicating the damage status at the specific position in the basic route La or the restoration status of the damage can be acquired. A worker holding the mobile terminal 9 can move to the specific position in the basic route La and inform the management system 1000 by voice of the damage status at the specific position in the basic route La or the restoration status of the damage. The route status data including the audio data is supplied from the mobile terminal 9 to the route-status-data acquisition unit 81 via the communication device 21.

The image data indicating the damage status at the specific position in the basic route La or the restoration status of the damage can be acquired by the monitoring camera 23. The route status data including the image data of the basic route La can be supplied from the monitoring camera 23 to the route-status-data acquisition unit 81 via the communication device 21.

The area-status-data acquisition unit 82 acquires area status data indicating the status of the area where the transportable device 6 is installed for substitution for the existing device 3. The area status data includes one or both of damage data indicating the damage status of the area in which the transportable device 6 is installed and restoration data indicating the restoration status of the damage. For example, a worker holding the mobile terminal 9 moves to the area where the transportable device 6 is installed. Image data indicating the damage status of the area where the transportable device 6 is installed or the restoration status of the damage is acquired by using the imaging device 9G of the mobile terminal 9. The area status data including the image data of the area where the transportable device 6 is installed is supplied from the mobile terminal 9 to the area-status-data acquisition unit 82 via the communication device 21 and the interface unit 11.

Audio data indicating the damage status of the area where the transportable device 6 is installed or the restoration status of the damage can be acquired. The area status data including the audio data can be supplied from the mobile terminal 9 to the area-status-data acquisition unit 82 via the communication device 21.

The image data indicating the damage status of the area where the transportable device 6 is installed or the restoration status of the damage can be acquired by the monitoring camera 23. The area status data including the image data of the area where the transportable device 6 is installed can be supplied from the monitoring camera 23 to the area-status-data acquisition unit 82 via the communication device 21.

The position-data acquisition unit 83 acquires position data indicating the position of the transportable device 6. The position data indicating the position of the transportable device 6 detected by the position detection device 22 is supplied to the position-data acquisition unit 83 via the communication device 21 and the interface unit 11.

The generation unit 13 generates alternative route data indicating the alternative route Lb for moving the transportable device 6 to the predetermined position PJ2 based on the route status data acquired by the route-status-data acquisition unit 81. In the present embodiment, the generation unit 13 decides the predetermined position PJ2 based on the area status data acquired by the area-status-data acquisition unit 82 to generate the alternative route data.

The estimation unit 14 estimates one or both of the moving time required for the transportable device 6 passing through the alternative route Lb generated by the generation unit 13 to arrive at the predetermined position PJ2 and the moving distance thereof. Further, the estimation unit 14 can estimate the moving time required for the transportable device 6 passing through the basic route La to arrive at the predetermined position PJ2, taking into consideration the expected restoration time required for restoring the specific position in the basic route La, based on the route status data including the damage data indicating the damage status at the specific position in the basic route La acquired by the route-status-data acquisition unit 81.

The storage unit 15 stores therein data required for planning of the route of the transportable device 6. The storage unit 15 stores therein track data indicating a track in the plant 1 on which the device vehicle 8 travels and basic route data indicating the basic route La. The track data includes a distance of the track, a gradient of a road surface of the track, a curvature (a curving degree) of the road surface of the track, a width of the road surface of the track, a position of a curve in the track, and a position of a crossing in the track.

When the transportable device 6 can pass through the basic route La, the basic route data stored in the storage unit 15 is output to the mobile terminal 9 held by a worker who drives the device vehicle 8. The worker on the device vehicle 8 drives the device vehicle 8 so as to travel on the basic route La, while watching the basic route data displayed on the display device 9C of the mobile terminal 9.

When the transportable device 6 cannot pass through the basic route La, the alternative route data generated by the generation unit 13 is output to the mobile terminal 9 held by the worker who drives the device vehicle 8. The worker on the device vehicle 8 drives the device vehicle 8 so as to travel on the alternative route Lb, while watching the alternative route data displayed on the display device 9C of the mobile terminal 9.

The estimation unit 14 calculates a moving time (an expected arrival time point) required for the transportable device 6 passing through the alternative route Lb to arrive at the predetermined position PJ2 based on the traveling speed (speed limit) of the device vehicle 8, the generated alternative route Lb, and the track data of the alternative route Lb.

The storage unit 15 stores therein log data indicating a relation between the damage status of the basic route La in the past and the time required for restoring the damage. The estimation unit 14 can calculate the expected restoration time required for restoring the specific position in the basic route La, based on the log data and the damage data indicating the damage status at the specific position in the basic route La acquired by the data acquisition unit 80.

The determination unit 16 determines whether the transportable device 6 (the device vehicle 8) can pass through the specific position based on the damage data indicating the damage status at the specific position in the basic route La acquired by the data acquisition unit 80. When it is determined that the transportable device 6 cannot pass through the specific position in the basic route La, the generation unit 13 generates the alternative route data.

The display control unit 18 controls the display device 5. The display control unit 18 processes the data supplied from the interface unit 11 to generate image data to be displayed on the display device 5. In the present embodiment, the display control unit 18 causes the display device 5 to display at least the alternative route data.

The interface unit 11 is connected to a plant system 31 via an emergency-operation-parameter transfer system 32. The interface unit 11 is also connected to a sub-system 33.

The plant system 31 manages plant data of the plant 1. The plant data includes operation data of the nuclear reactor system, and is detected by a sensor placed in the nuclear reactor system. The plant data includes, for example, temperature data of the nuclear reactor and flow rate data of the primary cooling water in the nuclear reactor system. The data acquisition unit 80 can acquire the plant data from the plant system 31.

The emergency-operation-parameter transfer system 32 outputs an operation parameter of the plant 1 in case of emergency. The data acquisition unit 80 can acquire the operation parameter in case of emergency from the emergency-operation-parameter transfer system 32.

The sub-system 33 manages peripheral data of the plant 1, which is different from the plant data. The peripheral data includes weather data, for example. The data acquisition unit 80 can acquire the peripheral data from the sub-system 33.

The information management unit 12 manages the plant data supplied from the plant system 31. The information management unit 12 also manages data supplied from the sub-system 33, the input device 20, and the communication device 21. The information management unit 12 also manages data stored in the database unit 19. The display control unit 18 generates display data to be displayed on the display device 5 from data managed by the information management unit 12.

The simulation unit 17 estimates a chronological change of the plant 1 based on the plant data to generate scenario data (plant estimation data) indicating an estimated event of the plant 1.

The database unit 19 stores therein the alternative route data generated by the generation unit 13. The database unit 19 also stores therein the plant data supplied from the plant system 31, the scenario data generated by the simulation unit 17, and the display data generated by the display control unit 18. The database unit 19 also stores therein data from the sub-system 33, the input device 20, and the communication device 21.

Figure 7:
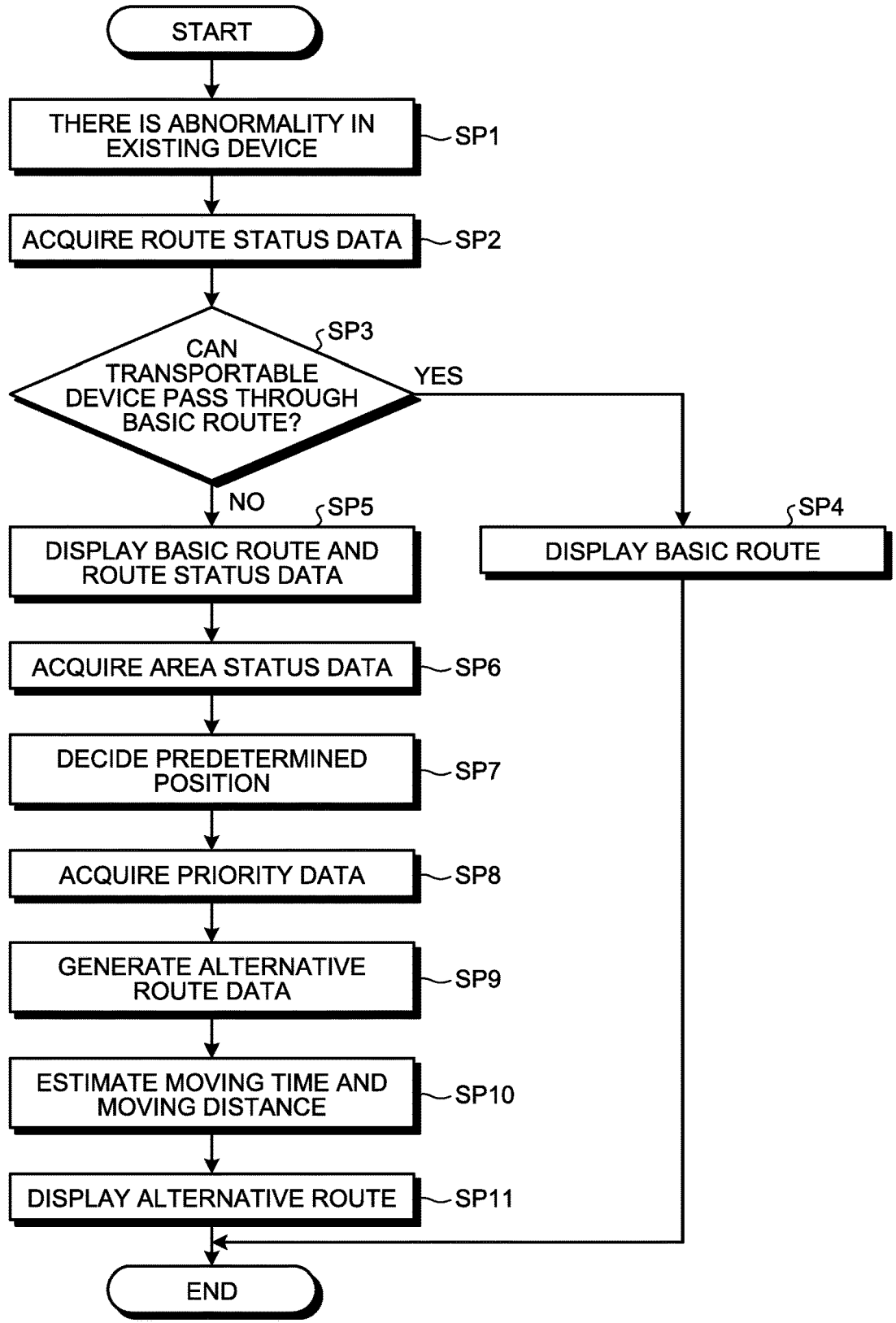
FIG. 7 is a flowchart illustrating an example of a route planning method according to the first embodiment.

An example of a route planning method according to the present embodiment is described next with reference to a flowchart in FIG. 7.

If a disaster such as a severe accident occurs in the plant 1, and an abnormality occurs in the existing device 3 due to the occurrence of the disaster (Step SP1), the route-status-data acquisition unit 81 acquires the route status data (Step SP2).

The route status data includes one or both of damage data indicating a damage status at a specific position in the basic route La and restoration data indicating a restoration status of the damage. The route status data is acquired by using one or both of the mobile terminal 9 and the monitoring camera 23. The route-status-data acquisition unit 81 in the route planning system 10A acquires the route status data indicating the status of the basic route La.

It is determined whether the transportable device 6 (the device vehicle 8) can pass through the basic route La based on the route status data (Step SP3).

Determination whether the transportable device 6 can pass through the basic route La is performed by the determination unit 16. The route status data is displayed on the display device 5 and a worker (manager) can determine whether the transportable device 6 (the device vehicle 8) can pass through the basic route La based on the display result.

At Step SP3, if it is determined that the transportable device 6 can pass through the basic route La (YES at Step SP3), the basic route data indicating the basic route La is displayed on the display device 5 (Step SP4). The route status data can be displayed on the display device 5. The route status data can be output as audio data from the audio output device 5S. For example, audio data of a site report of a worker can be output. For example, when at least one of facts that there is no damage in the basic route La, that the damage having occurred in the basic route La is minor, and that restoration of the damage having occurred in the basic route La has been complete is recognized, it is determined that the transportable device 6 can pass through the basic route La.

Figure 8:
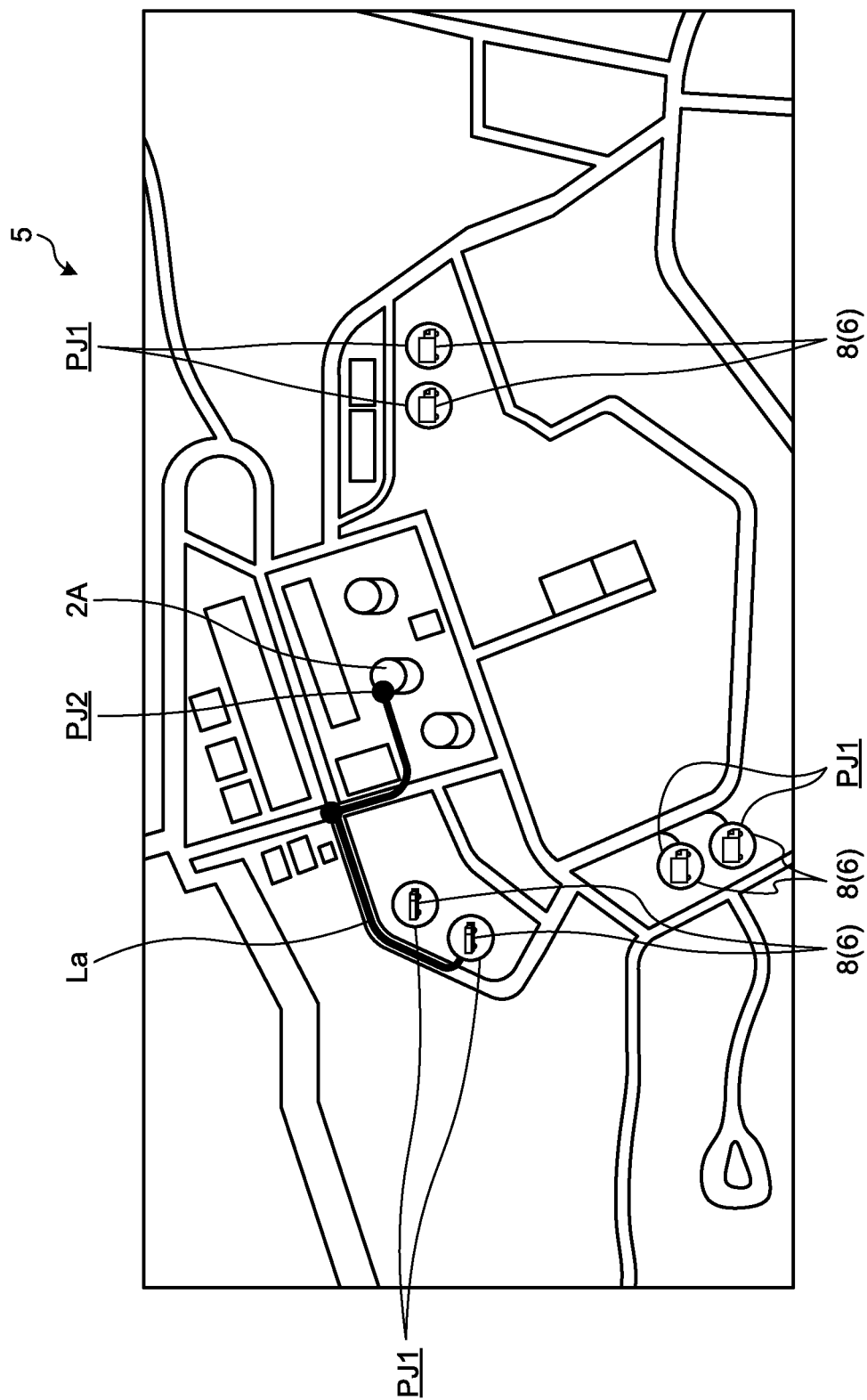
FIG. 8 is a diagram illustrating an example of the display device according to the first embodiment.

FIG. 8 is a diagram illustrating an example of the display device 5 that displays the basic route data. As illustrated in FIG. 8, the display device 5 displays the basic route data indicating the basic route La, together with map data of the plant 1.

As illustrated in FIG. 8, in the present embodiment, the transportable device 6 (the device vehicle 8) is provided in plural in the plant 1. The transportable devices 6 are respectively placed (held) at different standby positions PJ1. The route planning system 10A allocates an optimum transportable device 6 from the plurality of transportable devices 6, based on the type of the existing device 3 having an abnormality and the position of the existing device 3 having an abnormality. The route planning system 10A outputs the basic route data so as to connect the standby position PJ1 at which the allocated transportable device 6 is placed to the optimum predetermined position PJ2 for substitute for the existing device 3 having an abnormality.

The basic route data and the route status data are transmitted from the computer system 4 to the mobile terminal 9 held by a worker who drives the allocated device vehicle 8. The basic route data and the route status data are transmitted wirelessly to the mobile terminal 9 mounted on the device vehicle 8. The worker receives an instruction to move the transportable device 6 to the predetermined position PJ2 via the mobile terminal 9. The worker can drive the device vehicle 8 so that the transportable device 6 is carried to the predetermined position PJ2 passing through the basic route La, while watching the basic route data displayed on the display unit of the mobile terminal 9.

At Step SP3, if it is determined that the transportable device 6 cannot pass through the basic route La (NO at Step SP3), the route status data is displayed on the display device 5 together with the basic route data indicating the basic route La by the display control unit 18 (Step SP5). For example, when it is recognized that damage such as a landslide has occurred at a specific position in the basic route La, it is determined that the transportable device 6 cannot pass through the basic route La. The route status data can be output as audio data from the audio output device 5S. For example, audio data of a site report (a damage status report) of the worker who holds the mobile terminal 9 and has confirmed the route can be output.

Figure 9:
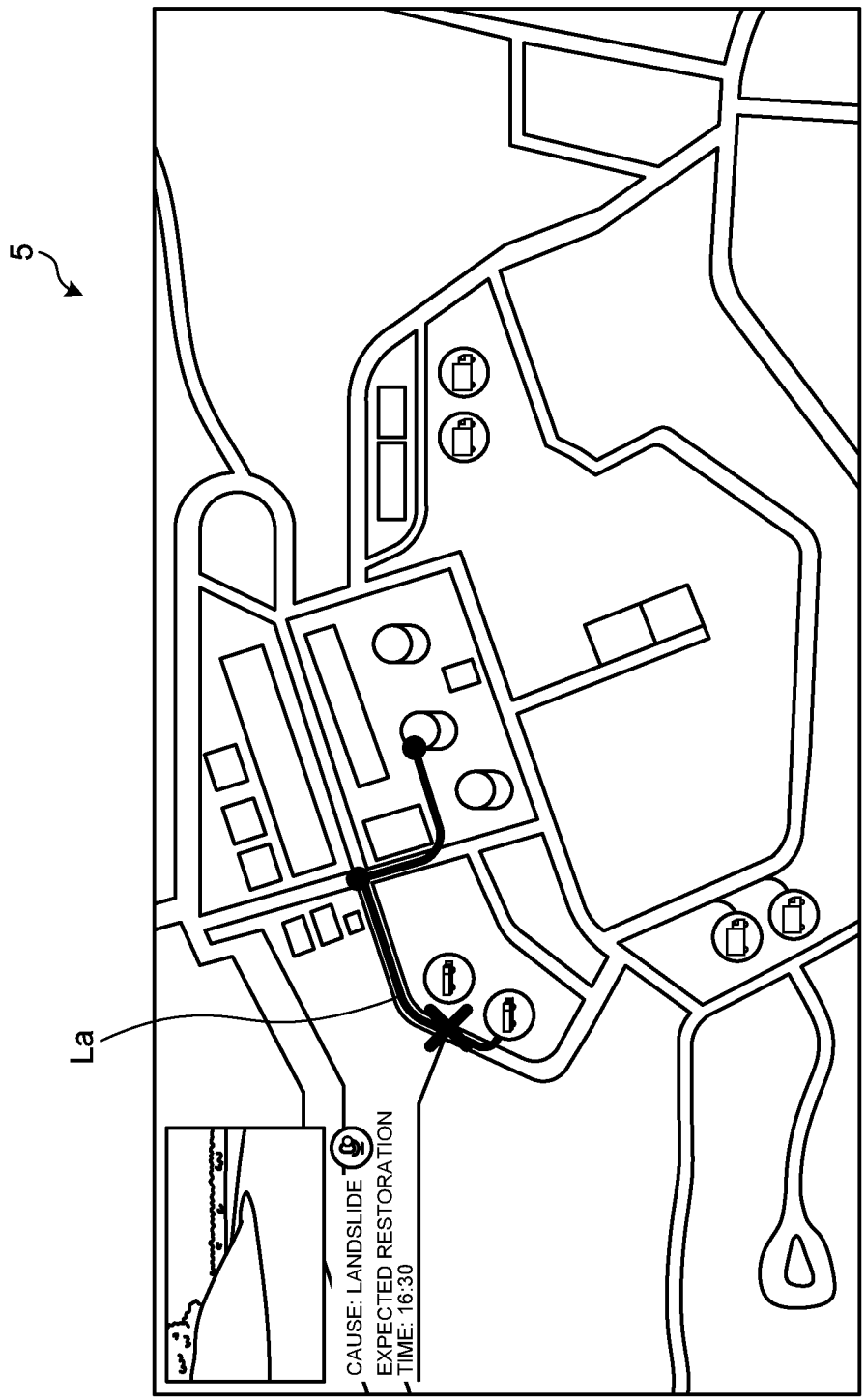
FIG. 9 is a diagram illustrating an example of the display device according to the first embodiment.

FIG. 9 is a diagram illustrating an example of the display device 5 that displays the basic route data. As illustrated in FIG. 9, the display device 5 displays the basic route data indicating the basic route La and the route status data, together with the map data of the plant 1.

As described above, the route status data includes the image data. As illustrated in FIG. 9, a mark (as an example, a cross (x)) is displayed at a specific position in the basic route La where damage has occurred. Data of the damage having occurred at the specific position is displayed as image data in association with the specific position. Further, the contents of the damage (in this example, a landslide) are displayed on the display device 5. By touching an icon displayed on the display unit of the display device 5, audio data of the site report of a worker can be output.

The estimation unit 14 calculates an expected restoration time (an expected restoration time point) required for restoring the specific position. As described above, the estimation unit 14 can calculate the expected restoration time (or the expected restoration time point) required for restoring the specific position in the basic route La, based on the log data in the past stored in the storage unit 15 and the damage data indicating the damage status at the specific position in the basic route La acquired by the data acquisition unit 80. The calculated expected restoration time (or the expected restoration time point) is displayed on the display device 5.

The area-status-data acquisition unit 82 acquires the area status data (Step SP6). The area status data indicates a status of the area in which the transportable device 6 is installed for substitution.

Even if it is determined that the basic route La is impassable, the route status data and the area status data can be transmitted from the computer system 4 to the mobile terminal 9 held by a worker who drives the allocated device vehicle 8. The route status data is wirelessly transmitted to the mobile terminal 9 mounted on the device vehicle 8. The worker can ascertain the route status and the area status via the mobile terminal 9.

Figure 10:
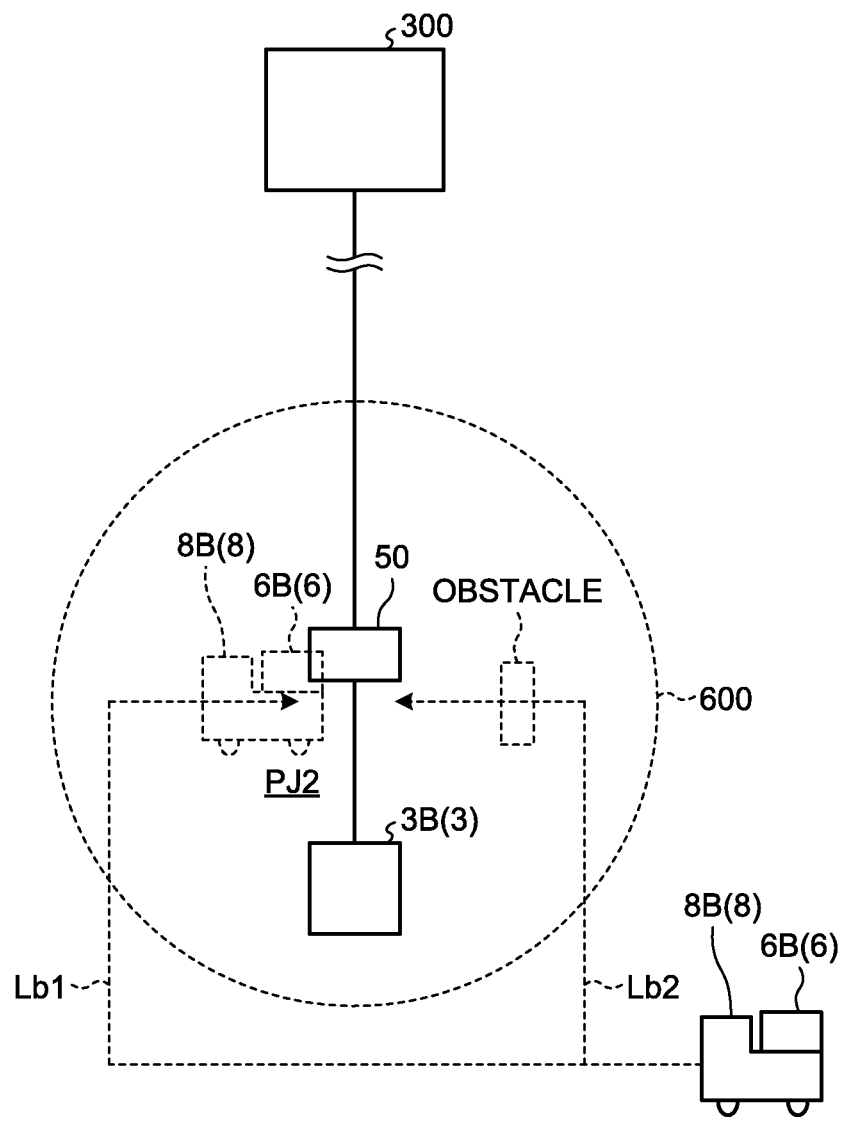
FIG. 10 is a diagram schematically illustrating an example of an area around an existing device having an abnormality.

FIG. 10 is a diagram schematically illustrating an example of an area 600 around the existing device (the existing power source 3B) having an abnormality. The existing device 3 supplies power to an electric device 300 of the plant 1 via a relay device 50 including a connector. If an abnormality occurs in the existing device 3, the transportable device 6 (the transportable power source 6B) is installed in the area 600 and connected to the relay device 50.

When the transportable device 6 enters the area 600 for substitution for the existing device 3 and approaches the relay device 50, the transportable device 6 can approach the relay device 50 via a plurality of routes. In the example illustrated in FIG. 10, the transportable device 6 can approach the relay device 50 through at least one of a first route Lb1 and a second route Lb2.

An obstacle such as debris may be present inside the area 600 due to occurrence of a disaster. If the obstacle is located in the second route Lb2, the transportable device 6 needs to approach the relay device 50 by passing through the first route Lb1.

In the present embodiment, the area status data indicating the status of the area 600 is acquired by the interface unit 11. The area status data includes one or both of damage data indicating a damage status of the area 600 and restoration data indicating a restoration status of the damage. The area status data is acquired by using one or both of the mobile terminal 9 and the monitoring camera 23. The interface unit 11 of the route planning system 10A acquires the route status data indicating the status of the area 600.

The generation unit 13 decides the predetermined position PJ2 at which the transportable device 6 is installed based on the area status data (Step SP7). In the example illustrated in FIG. 10, an end point of the first route Lb1 is decided as the predetermined position PJ2.

Priority data indicating a parameter having a priority in generation of the alternative route data is input from the input device 20 and acquired by the priority-data acquisition unit 84 (Step SP8). The priority data acquired by the priority-data acquisition unit 84 is supplied to the generation unit 13. The generation unit 13 generates the alternative route data based on the priority data (Step SP9).

The parameter having a priority in generation of the alternative route data includes at least one of a moving time required for the transportable device 6 to arrive at the predetermined position PJ2, a moving distance of the transportable device 6 to the predetermined position PJ2, a gradient of a road surface on which the transportable device 6 travels until arriving at the predetermined position PJ2, a curvature of the road surface on which the transportable device 6 travels until arriving at the predetermined position PJ2, and a width of the road surface on which the transportable device 6 travels until arriving at the predetermined position PJ2. The priority data indicating these parameters is input via the input device 20.

For example, when it is desired that the transportable device 6 arrives at the predetermined position PJ2 in a short time, the "moving time" is input as the priority data. When it is desired to suppress a traveling distance of the transportable device 6, the "moving distance" is input as the priority data. When it is desired to carry the transportable device 6 without tilting the transportable device 6, the "gradient of the road surface" or the "curvature of the road surface" is input as the priority data. When the transportable device 6 or the vehicle 7 that transports the transportable device 6 is large, the "width of the road surface" is input as the priority data.

As described above, the data of the track in the plant 1 on which the device vehicle 8 can travel is stored in the storage unit 15. The generation unit 13 extracts an optimum track from tracks provided in the plant 1 to generate the alternative route Lb based on the track data.

After the alternative route data has been generated, the estimation unit 14 estimates one or both of the moving time required for the transportable device 6 passing through the alternative route Lb to arrive at the predetermined position PJ2 and the moving distance thereof (Step SP10).

After the alternative route data has been generated, the display control unit 18 causes the display device 5 to display the alternative route data indicating the alternative route Lb (Step SP11).

Figure 11:
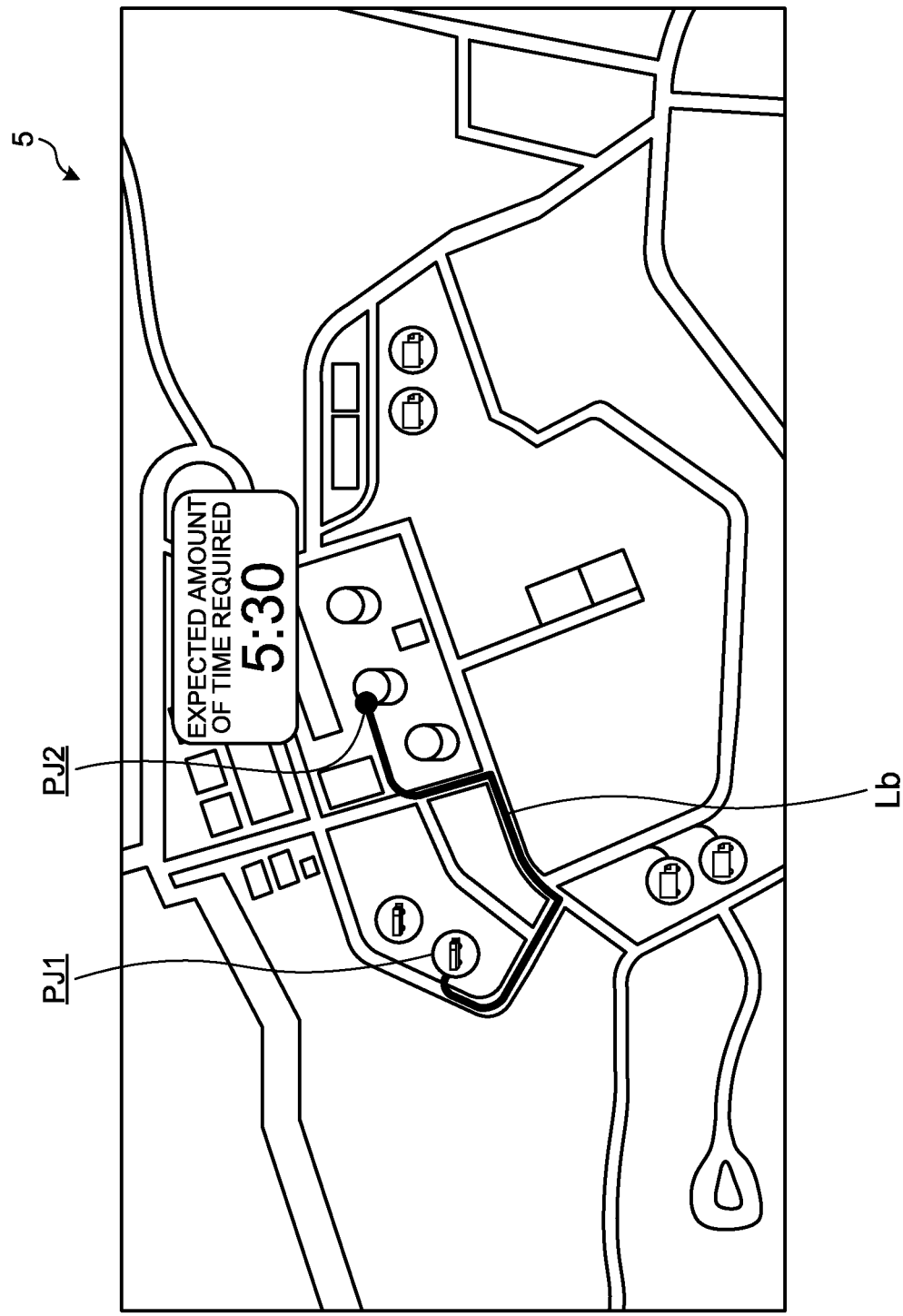
FIG. 11 is a diagram illustrating an example of the display device according to the first embodiment.

FIG. 11 is a diagram illustrating an example of the display device 5 that displays the alternative route data. As illustrated in FIG. 11, the display control unit 18 causes the display device 5 to display the alternative route data indicating the alternative route Lb, together with the map data of the plant 1. The audio output device 5S can output the alternative route data by voice.

Further, the display control unit 18 causes the display device 5 to display the moving time data indicating the moving time (expected amount of time required) of the transportable device 6 passing through the alternative route Lb, which has been estimated by the estimation unit 14. The display control unit 18 can cause the display device 5 to display the moving distance data indicating the moving distance (expected moving distance) of the transportable device 6 passing through the alternative route Lb, which has been estimated by the estimation unit 14.

The alternative route data and the route status data are transmitted from the computer system 4 to the mobile terminal 9 held by a worker who drives the allocated device vehicle 8. The worker receives an instruction to move the transportable device 6 to the predetermined position PJ2 via the mobile terminal 9. The worker can drive the device vehicle 8 so that the transportable device 6 is carried to the predetermined position PJ2 through the alternative route Lb, while watching the alternative route data displayed on the display device 9C of the mobile terminal 9.

Figure 12:
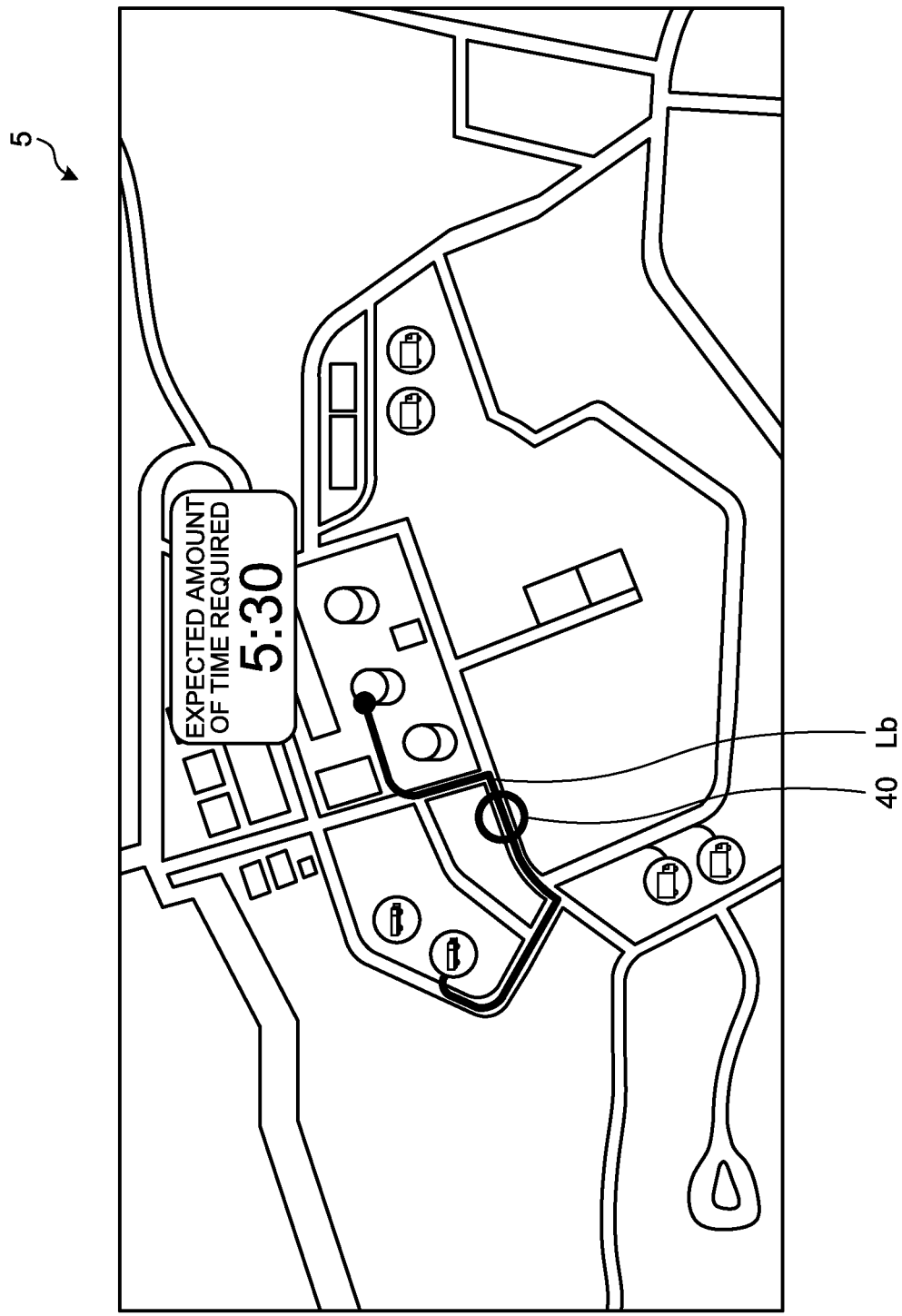
FIG. 12 is a diagram illustrating an example of the display device according to the first embodiment.

FIG. 12 is a diagram illustrating an example of the display device 5 that displays the position data of the transportable device 6 moving on the alternative route Lb. As illustrated in FIG. 12, the display device 5 can display the position data of the transportable device 6 moving on the alternative route Lb, together with the map data of the plant 1 and the alternative route data. In the example illustrated in FIG. 12, the position data of the transportable device 6 is displayed by using a circular icon 40.

In the present embodiment, the estimation unit 14 calculates the expected restoration time required for restoring the specific position in the basic route La, and can estimate the moving time required for the transportable device 6 passing through the basic route La to arrive at the predetermined position PJ2, taking the expected restoration time into consideration. When the moving time of the transportable device 6 when passing through the basic route La is compared with the moving time of the transportable device 6 when passing through the alternative route Lb, and it is determined that the expected arrival time to the predetermined position PJ2 when passing through the basic route La is earlier than that when passing through the alternative route Lb, the transportable device 6 does not necessarily need to pass through the alternative route Lb.

In the present embodiment, the route status data is wirelessly transmitted to the mobile terminal 9 held by a worker who drives the device vehicle 8 allocated to move to the predetermined position PJ2. The route status data can be wirelessly transmitted also to the mobile terminal 9 held by a worker who drives the device vehicle 8 that is not allocated to move to the predetermined position PJ2. The route status data can be wirelessly transmitted to the mobile terminal 9 held by a worker who does not drive the device vehicle 8. Accordingly, all the workers can ascertain the route status.

As described above, according to the present embodiment, when it is determined that it is difficult to transport the transportable device 6 quickly to the predetermined position PJ2 based on the route status data of the basic route La, the alternative route data is generated. Therefore, route planning of the transportable device 6 is appropriately performed based on the alternative route data displayed on the display device 5. For example, a worker (manager) can perform the route planning appropriately by using the alternative route data displayed on the display device 5.

According to the present embodiment, the area status data indicating the status of the area 600 in which the transportable device 6 is installed for substitution for the existing device 3 is acquired. The predetermined position PJ2 is decided based on the acquired area status data and the alternative route data is generated. Accordingly, even if the area 600 is changed to be in an abnormal status different from the normal time such that there is an obstruction in the area 600 because of a disaster, the route planning of the transportable device 6 is appropriately performed based on the area status data.

According to the present embodiment, the route status data includes one or both of the damage data indicating the damage status at a specific position in the basic route La and the restoration data indicating the restoration status of the damage. Accordingly, when the basic route La is damaged, the route planning of the transportable device 6 is appropriately performed based on the alternative route data. When the basic route La is restored, the route planning of the transportable device 6 is appropriately performed based on at least one of the basic route data and the alternative route data.

According to the present embodiment, it is determined whether the transportable device 6 can pass through a specific position in the basic route La where damage has occurred based on the route status data including the damage data. When it is determined that the transportable device 6 cannot pass through the specific position in the basic route La, the alternative route data is generated. Accordingly, the route planning of the transportable device 6 is appropriately performed according to the status of the specific position where the damage has occurred in the basic route La.

According to the present embodiment, one or both of the moving time required for the transportable device 6 passing through the alternative route Lb to arrive at the predetermined position PJ2 and the moving distance thereof is estimated. Accordingly, the route planning of the transportable device 6 is appropriately performed based on one or both of the estimated moving time and moving distance.

According to the present embodiment, the route status data includes the damage data indicating the damage status of the specific position in the basic route La. The moving time required for the transportable device 6 passing through the basic route La to arrive at the predetermined position PJ2 is estimated, taking into consideration the expected restoration time required for restoring the specific position in the basic route La. Accordingly, the expected moving time when the transportable device 6 passes through the basic route La can be compared with the expected moving time when the transportable device 6 passes through the alternative route Lb based on the expected restoration time of the specific position in the basic route La. The route planning of the transportable device 6 is appropriately performed based on a comparison result.

According to the present embodiment, the display device 5 displays one or both of the moving time data indicating the estimated moving time of the transportable device 6 and the moving distance data indicating the estimated moving distance. Accordingly, the route planning of the transportable device 6 is appropriately performed based on one or both of the moving time data and the moving distance data displayed on the display device 5.

According to the present embodiment, the alternative route data generated by the generation unit 13 is held in the database unit 19. Accordingly, the alternative route data is accumulated. The accumulated alternative route data contributes to appropriate execution of the route planning in case of future emergency.

According to the present embodiment, the position data indicating the position of the transportable device 6 is also displayed on the display device 5. Accordingly, the position of the transportable device 6 is recognized on a real-time basis via the display device 5. Therefore, a worker (manager) can appropriately perform the route planning of the transportable device 6.

According to the present embodiment, various types of data including the route status data are wirelessly transmitted from the computer system 4 to the mobile terminal 9 held by a worker. Accordingly, the worker can recognize the various types of data including the route status data on a real-time basis via the mobile terminal 9.

According to the present embodiment, the route status data includes image data of the basic route La. Accordingly, the worker (manager) can smoothly recognize the status of the basic route La via the display device 5.

According to the present embodiment, the display device 5 displays the alternative route data together with the map data of the plant 1. Accordingly, the worker (manager) can smoothly recognize via the display device 5 which track of the plurality of tracks in the plant 1 the transportable device 6 passes to move to the predetermined position PJ2.

According to the present embodiment, the route status data includes audio data and is output from the audio output device 5S. Accordingly, the worker (manager) can smoothly recognize the status of the basic route La via hearing sense.

According to the present embodiment, the priority data is input, which indicates at least one of the moving time required for the transportable device 6 to arrive at the predetermined position PJ2, the moving distance of the transportable device to the predetermined position PJ2, the gradient of the road surface on which the transportable device 6 travels until arriving at the predetermined position PJ2, the curvature of the road surface on which the transportable device 6 travels until arriving at the predetermined position PJ2, and the width of the road surface on which the transportable device 6 travels until arriving at the predetermined position PJ2, and the alternative route data is generated based on the priority data. Accordingly, because the priority data is input, for example, based on the structure or the performance of the transportable device 6, optimum route planning is performed.

Second Embodiment

A second embodiment is described. In the following descriptions, constituent elements like or equivalent to those in the above embodiment are denoted by like reference signs and descriptions thereof will be simplified or omitted.

Figure 13:
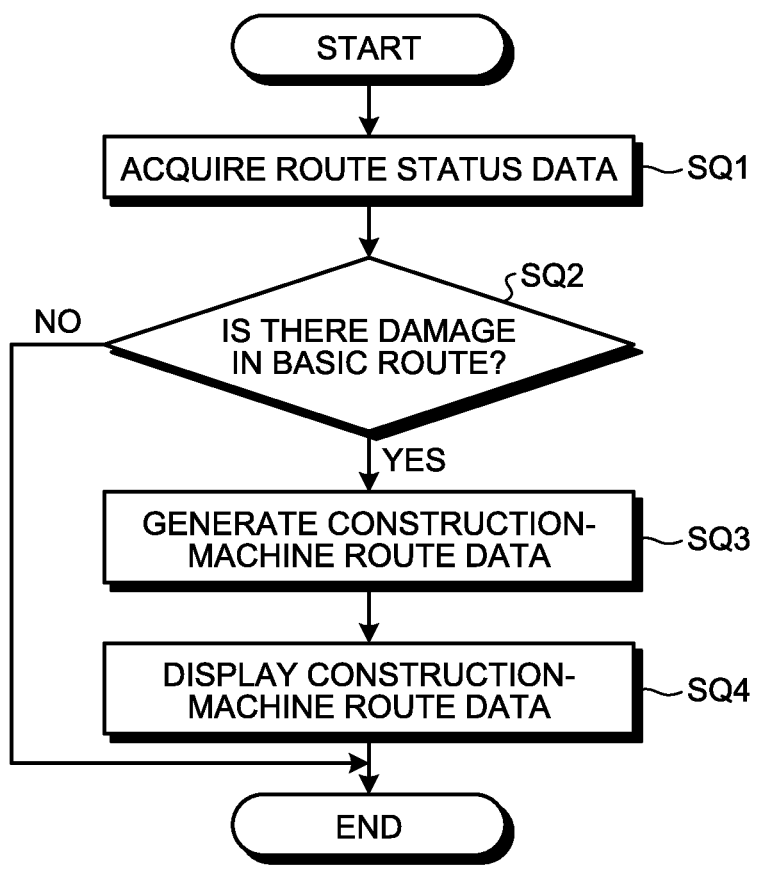
FIG. 13 is a flowchart illustrating an example of a route planning method according to a second embodiment.

FIG. 13 is a flowchart illustrating an example of a route planning method according to the present embodiment. As described in the embodiment described above, the route status data includes damage data indicating a damage status at a specific position in the basic route La. The generation unit 13 can generate construction-machine route data indicating a route of a construction machine for restoring the specific position in the basic route La, through which the construction machine is moved to the specific position, based on the route status data.

The route-status-data acquisition unit 81 acquires the route status data (Step SQ1). The determination unit 16 determines whether the transportable device 6 can pass through a specific position in the basic route La based on the route status data (Step SQ2).

At Step SQ2, if there is no damage in the basic route La and it is determined that the transportable device 6 can pass through the basic route La (NO at Step SQ2), normal processing is continued.

At Step SQ2, if there is damage in the basic route La and it is determined that the transportable device 6 cannot pass through the basic route La (YES at Step SQ2), the generation unit 13 generates the construction-machine route data indicating the construction machine route for moving the construction machine for restoring the specific position to the specific position (Step SQ3).

At Step SQ2, if there is damage in the basic route La and it is determined that the transportable device 6 cannot pass through the basic route La (YES at Step SQ2), the route planning system 10A generates the alternative route data according to the embodiment described above, and the display device 5 displays the alternative route (Step SP5 to Step SP11).

After the construction-machine route data has been generated, the construction-machine route data is displayed on the display device 5 (Step SQ4).

The construction machine includes a power shovel, a bulldozer, and a dump truck. By generating the construction-machine route data, the construction machine can be quickly delivered to a site for restoration.

As described above, according to the present embodiment, the construction-machine route data indicating the construction machine route for moving the construction machine for restoring the specific position in the basic route La to the specific position is generated based on the route status data. Accordingly, route planning of not only the transportable device 6 but also the construction machine can be appropriately performed. The construction machine can be quickly moved to the specific position where damage has occurred in the basic route La, thereby enabling to contribute to early restoration.

In the first and second embodiments described above, the generation unit 13 generates the alternative route data. When it is determined that the device vehicle 8 cannot pass through the basic route La, a worker (manager) can generate the alternative route, while watching the display screen of the display device 5. As described above, the display device 5 includes the touch panel. After deciding the alternative route, the worker can operate the touch panel of the display device 5 to display the alternative route Lb on the display device 5. For example, the worker can display the alternative route Lb on the display device 5 by handwriting input.

Third Embodiment

A third embodiment is described. In the following descriptions, constituent elements like or equivalent to those in the above embodiments are denoted by like reference signs and descriptions thereof will be simplified or omitted.

If a natural phenomenon such as an earthquake, a typhoon, or a tsunami has occurred, for example, in a state in which the transportable device 6 is held at the standby position PJ1, there may be damage such that the transportable device 6 moves from the standby position PJ1 or the position detection device 22 mounted on the transportable device 6 has a failure. If such damage has occurred, in the present embodiment, a confirmation work of the state of the transportable device 6 is performed. The confirmation work can be performed by visual judgment by a worker who has moved to the standby position PJ1, or via aerial images taken by a drone that has flown in the air to the standby position PJ1.

According to the present embodiment, the display control unit 18 causes the display device 5 to display a transportable device 6 determined not to have been damaged, and a transportable device 6 determined to have been damaged or a transportable device 6 that is unclear if it has been damaged, by the confirmation work in different display modes from each other. The transportable device 6 that is unclear if it has been damaged includes a transportable device 6 for which the confirmation work has not be performed.

Figure 14:
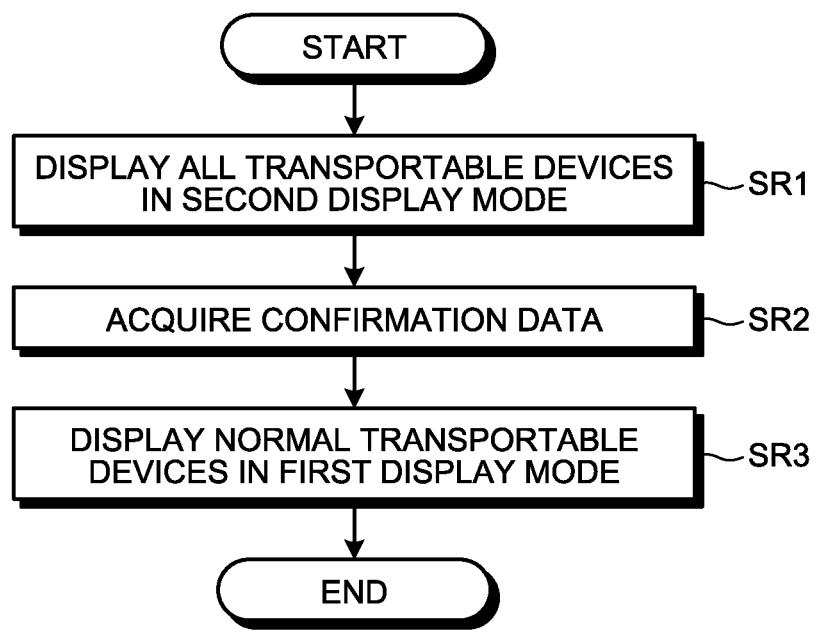
FIG. 14 is a flowchart illustrating an example of a route planning method according to a third embodiment.
Figure 15:
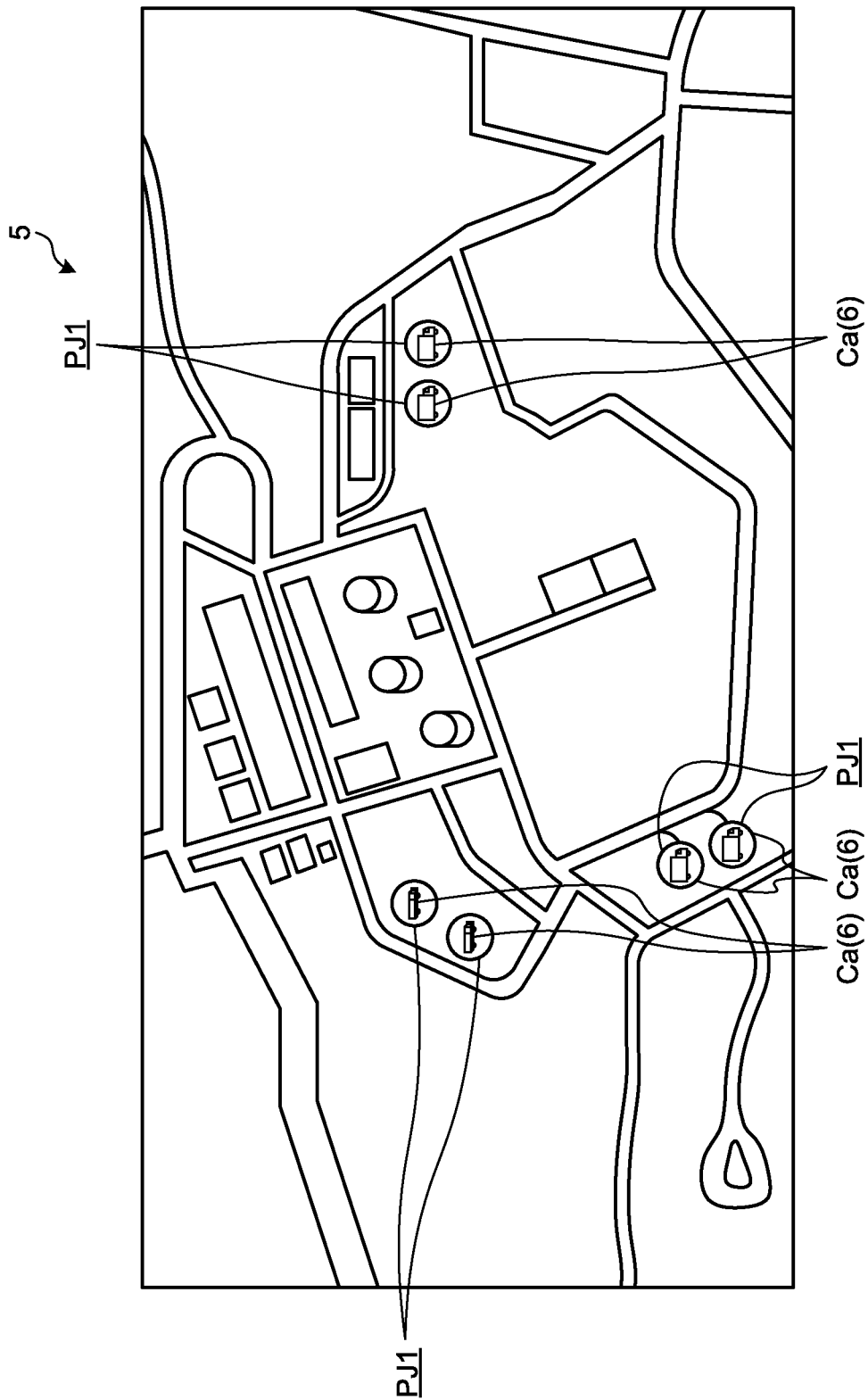
FIG. 15 is a diagram illustrating an example of a display device according to the third embodiment.
Figure 16:
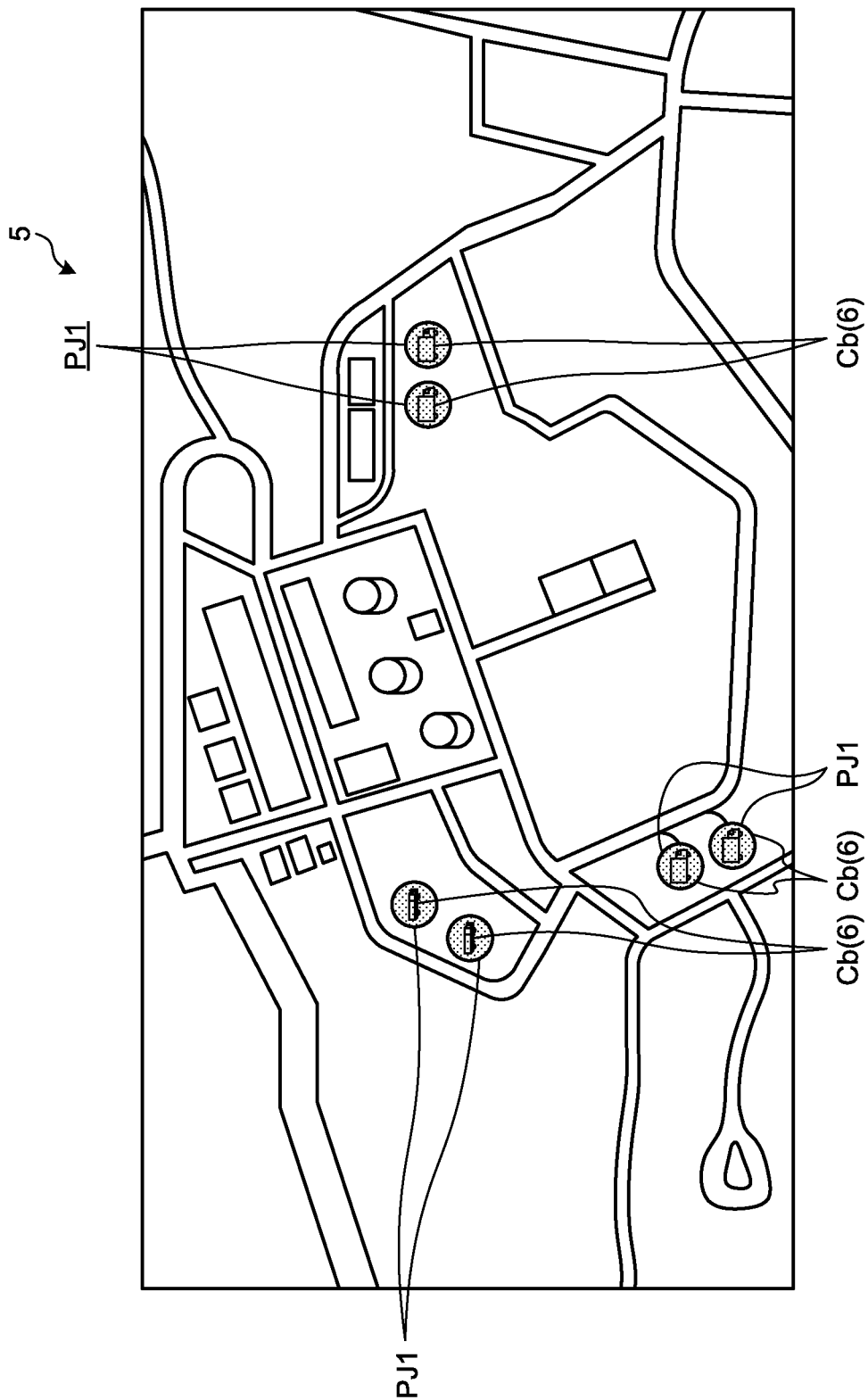
FIG. 16 is a diagram illustrating an example of the display device according to the third embodiment.
Figure 17:
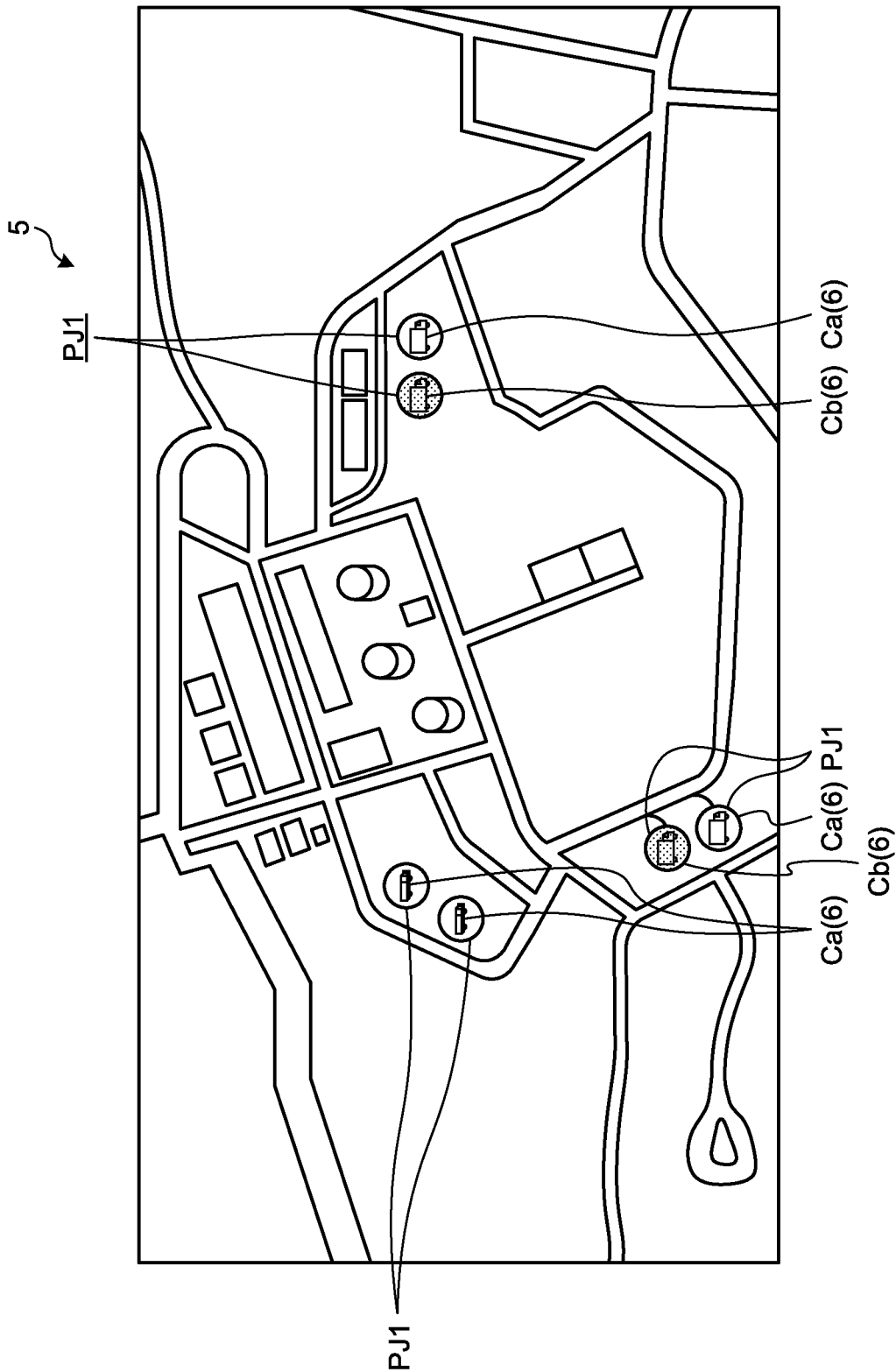
FIG. 17 is a diagram illustrating an example of the display device according to the third embodiment.

FIG. 14 is a flowchart illustrating an example of an operation of the route planning system 10A according to the present embodiment. FIGS. 15, 16, and 17 illustrate a display example of the display device 5 according to the present embodiment.

When the transportable device 6 held at the standby position PJ1 is normal, as illustrated in FIG. 15, the display control unit 18 causes the display device 5 to display the transportable device 6 in a first display mode. In the present embodiment, it is assumed that a white icon Ca indicating the transportable device 6 is displayed on the display device 5.

If a natural phenomenon such as an earthquake, a typhoon, or a tsunami has occurred in the state in which the transportable device 6 is held at the standby position PJ1, as illustrated in FIG. 16, the display control unit 18 causes the display device 5 to display all the transportable devices 6 in a second display mode, which is different from the first display mode (Step SR1). In the present embodiment, it is assumed that a red icon Cb indicating the transportable device 6 is displayed on the display device 5.

The confirmation work of the state of the transportable device 6 is performed. For example, when a worker moves to the standby position PJ1 to perform the confirmation work, it is confirmed whether the transportable device 6 has moved from the standby position PJ1 and whether the transportable device 6 has a failure.

The worker operates the mobile terminal 9 to transmit a confirmation result to the route planning system 10A. The data acquisition unit 80 acquires confirmation data indicating the state of the transportable device 6, transmitted from the mobile terminal 9 (Step SR2).

In the present embodiment, the confirmation data includes first confirmation data indicating that the transportable device 6 is present at the standby position PJ1 and does not have a failure, second confirmation data indicating that the transportable device 6 has moved from the standby position PJ1 but does not have a failure, third confirmation data indicating that the transportable device 6 is present at the standby position PJ1 but has a failure, fourth confirmation data indicating that the transportable device 6 has moved from the standby position PJ1 and has a failure, and fifth confirmation data indicating that it is unclear whether the transportable device 6 has been damaged.

As illustrated in FIG. 17, the display control unit 18 causes the display device 5 to display the transportable device 6, to which the first confirmation data has been transmitted, in the first display mode. On the other hand, the display control unit 18 causes the display device 5 to display the transportable device 6, to which the second, third, fourth, or fifth confirmation data has been transmitted, in the second display mode (Step SR3).

In this manner, according to the present embodiment, the transportable device 6 determined by the confirmation work that it has not been damaged is displayed by the white icon Ca, and the transportable device 6 determined to have been damaged or the transportable device 6 that is unclear if it has been damaged is displayed by the red icon Cb.

The transportable device 6 displayed by the white icon Ca is a transportable device 6 determined not to have been damaged as a result of the confirmation work. The transportable device 6 displayed by the red icon Cb is a transportable device 6 determined to have been damaged as a result of the confirmation work or a transportable device 6 in an unconfirmed state, for which the confirmation work has not been performed. A worker (manager) can judge which transportable device 6 is trustable and which transportable device 6 is not trustable, by watching the display device 5.

In the present embodiment, it is assumed that after a natural phenomenon such as an earthquake, a typhoon, or a tsunami has occurred, the confirmation work is performed, and a confirmed transportable device 6, a damaged transportable device 6, and an unconfirmed transportable device 6, among the plurality of transportable devices 6, are displayed respectively in different display modes based on a result of the confirmation work. For example, if there is a communication abnormality in the position detection device 22 of a part of the transportable devices 6, the display control unit 18 can cause the display device 5 to display the transportable device 6 having a communication abnormality and the transportable device 6 having no communication abnormality respectively in different display modes.

Further, after the natural phenomenon such as an earthquake, a typhoon, or a tsunami has occurred, the confirmation work can be performed with respect to a plurality of routes in the plant 1. Based on a result of the confirmation work, the display control unit 18 can cause the display device 5 to display a passable route, a damaged route, and an unconfirmed route, among the plurality of routes, respectively in different display modes. A worker (manager) can judge which route is to be used and which route is not to be used, by watching the display device 5.

In the case where a plurality of detection devices that detect a quantity of state (for example, water level sensors) are provided in the plant 1, and of the plurality of detection devices, there is a detection device that does not transmit a detection signal to the communication device 21 of the route planning system 10A, the display control unit 18 can cause the display device 5 to display an icon of an abnormal detection device that does not transmit a detection signal and an icon of a normal detection device in different display modes. A worker (manager) can judge which detection device is to be used and which detection device is not to be used by watching the display device 5.

Fourth Embodiment

A fourth embodiment is described. In the following descriptions, constituent elements like or equivalent to those in the above embodiments are denoted by like reference signs and descriptions thereof will be simplified or omitted.

For example, there may be a state in which data communication between the mobile terminal 9 and the management system 1000 via a mobile phone communication network becomes difficult in the plant 1 due to a severe accident or a natural phenomenon. In the present embodiment, measures when data communication between the mobile terminal 9 and the management system 1000 becomes difficult are described.

Figure 18:
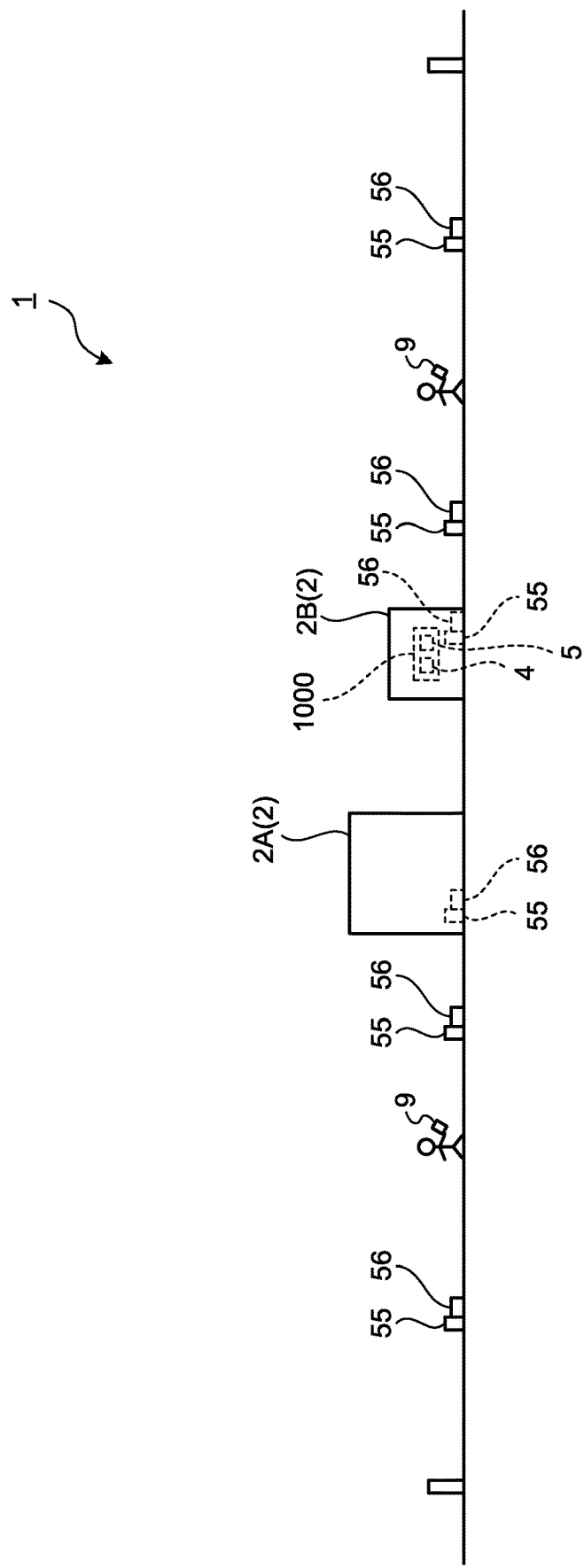
FIG. 18 is a diagram schematically illustrating an example of a plant according to a fourth embodiment.

FIG. 18 is a diagram schematically illustrating an example of the plant 1 according to the present embodiment. In the present embodiment, a wireless LAN (local area network) is provided in the plant 1. A wireless LAN router 55 such as a Wi-fi router is placed in each of a plurality of places in the plant 1. The wireless LAN router 55 is connected to a mobile battery 56. The wireless LAN router 55 is operated by using power supplied from the mobile battery 56. The management system 1000 and the mobile terminal 9 are provided with a wireless LAN adapter, respectively. The management system 1000 and the mobile terminal 9 can perform data communication via the wireless LAN router 55.

According to the present embodiment, even if the mobile phone communication network cannot be used, for example, in case of disaster, the mobile terminal 9 and the management system 1000 can perform data communication via the wireless LAN router 55. Further, the management system 1000 and the mobile terminal 9 can perform data communication with external facilities of the plant 1 via the wireless LAN router 55. Accordingly, one or both of the management system 1000 and the mobile terminal 9 can transmit data from the plant 1 to the external facilities, in case of emergency of the plant 1.

Fifth Embodiment

A fifth embodiment is described. In the following descriptions, constituent elements like or equivalent to those in the above embodiments are denoted by like reference signs and descriptions thereof will be simplified or omitted.

Figure 19:
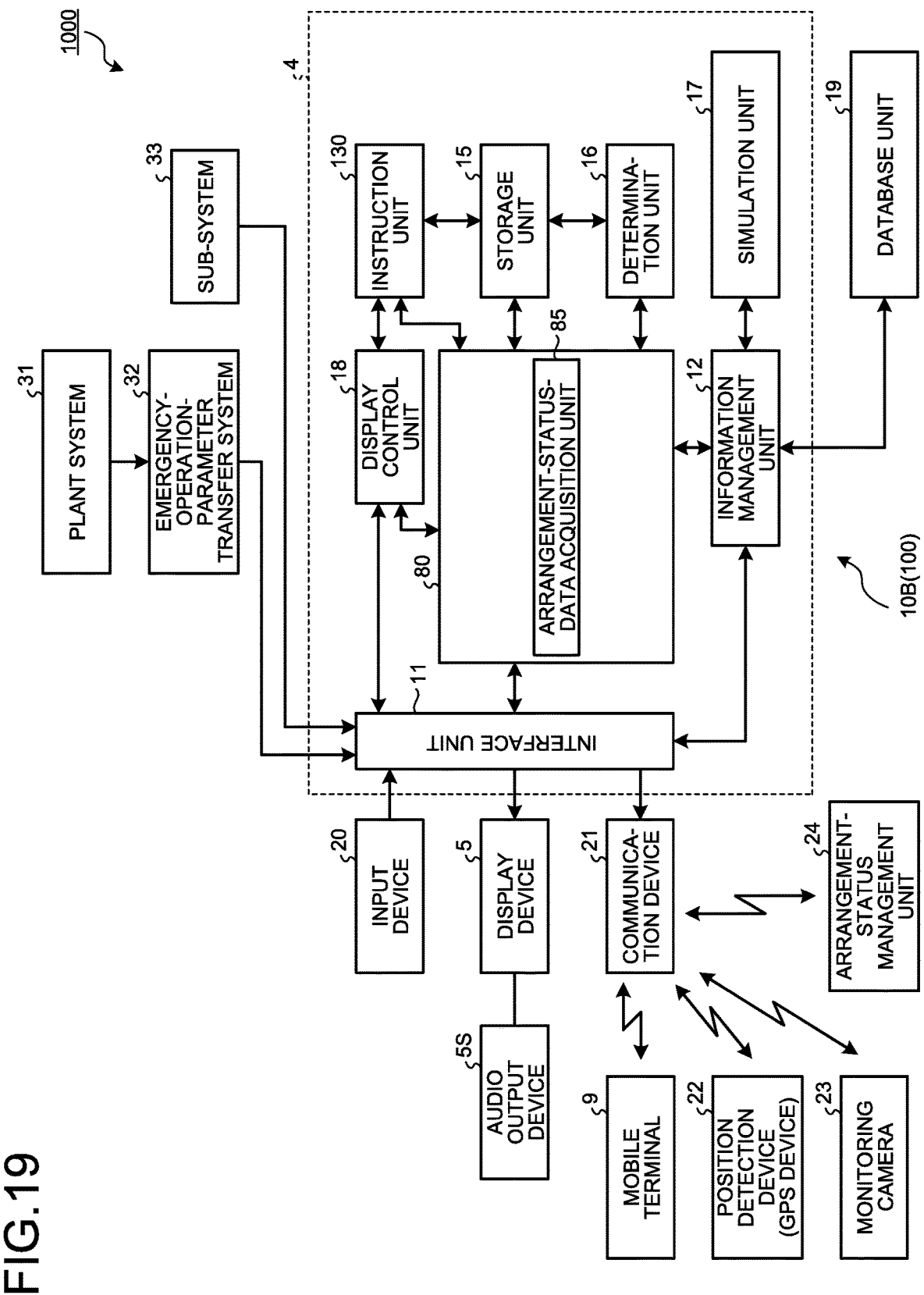
FIG. 19 is a functional block diagram illustrating an example of a management system according to a fifth embodiment.

FIG. 19 is a functional block diagram illustrating an example of the management system 1000 according to the present embodiment. As illustrated in FIG. 19, the management system 1000 includes the computer system 4 and the display device 5.

According to the present embodiment, the management system 1000 includes an article-arrangement planning system 10B that plans arrangement of articles including relief supplies in case of emergency of the plant 1. Further, the management system 1000 includes the decision-making support system 100 that supports decision making of measures against various events in case of emergency such as in the event of a disaster. The functions of the article-arrangement planning system 10B are exerted by the arithmetic processing device 1002 of the computer system 4 and the computer program stored in the storage device 1004, described with reference to FIG. 2.

The article-arrangement planning system 10B acquires arrangement status data indicating an arrangement status of articles arranged in the plant 1 in case of emergency of the plant 1 such as in the event of a disaster. The display control unit 18 causes the display device 5 to display the arrangement status data. A worker (manager) can plan arrangement of necessary and sufficient articles in case of emergency based on a display result on the display device 5.

The computer system 4 in the management system 1000 includes the interface unit 11, the data acquisition unit 80, the information management unit 12, an instruction unit 130, the storage unit 15, the determination unit 16, the simulation unit 17, and the display control unit 18.

The management system 1000 includes the database unit 19 connected to the computer system 4, the input device 20 connected to the computer system 4, the display device 5 connected to the computer system 4, the mobile terminal 9 connected to the computer system 4 via the communication device 21, the position detection device 22 connected to the computer system 4 via the communication device 21, the monitoring camera 23 connected to the computer system 4 via the communication device 21, and an arrangement-status management unit 24. The communication device 21 can be a wireless communication device or a wired communication device.

The input device 20 includes at least one of a keyboard, a mouse, a microphone, and a camera, and generates an input signal (an operation signal) by being operated by a worker. The input device 20 can be provided in plural. When the display device 5 includes a touch panel, the input device 20 includes a display unit of the display device 5. The input signal generated by operating the input device 20 is supplied to the interface unit 11.

The position detection device 22 detects the position of transport means 30 (see FIG. 1) that transports the articles (relief supplies) to the plant 1, and outputs position data indicating the position of the transport means 30 (transport status data).

The transport means 30 includes not only transport vehicles but also at least one of railways, aircrafts, and marine vessels. In the present embodiment, it is assumed that the transport means 30 is mainly a transport vehicle. In the following descriptions, the transport means 30 is appropriately referred to as "transport vehicle 30".

In the present embodiment, the position detection device 22 includes a GPS (Global Positioning System) device. A GPS receiver is mounted on the transport vehicle 30. The position detection device 22 includes the GPS receiver mounted on the transport vehicle 30. The position detection device 22 detects the position of the transport vehicle 30 in the global coordinate system. Position data indicating the position of the transport vehicle 30 detected by the position detection device 22 is supplied to the interface unit 11 via the communication device 21. The position data detected by the position detection device 22 can be temporarily stored and supplied to the interface unit 11 connected in a wired manner.

The monitoring camera 23 is installed at a plurality of positions of the plant 1. Image data acquired by the monitoring camera 23 is supplied to the interface unit 11 via the communication device 21.

The mobile terminal 9 and the computer system 4 can be connected in a wired or wireless manner. Data communication can be performed in a state in which the mobile terminal 9 and the computer system 4 are connected to each other in a wired manner. The position detection device 22 and the computer system 4 can be connected in a wired or wireless manner. Data communication can be performed in a state in which the position detection device 22 and the computer system 4 are connected to each other in a wired manner. The monitoring camera 23 and the computer system 4 can be connected to each other in a wired manner. The monitoring camera 23 and the arrangement-status management unit 24 can be connected to each other in a wired manner.

The arrangement-status management unit 24 is placed in external facilities of the plant 1. A computer system in the external facilities of the plant 1 includes the arrangement-status management unit 24. The arrangement-status management unit 24 may be placed in internal facilities of the plant 1. The arrangement-status management unit 24 can perform data communication with the computer system 4 (the interface unit 11) of the plant 1. For example, a manager of the plant 1 inputs request data for requesting arrangement of articles to the input device 20. The request data is transmitted to the arrangement-status management unit 24 via the interface unit 11 and the communication device 21. A manager of the external facilities who has acquired the request data via the arrangement-status management unit 24 can arrange articles based on the request data so that the requested articles are supplied to the plant 1. The arrangement-status management unit 24 can perform data communication with the computer system 4 in a wireless manner via the communication device 21, or in a wired manner via the communication device 21.

As an example of the external facilities, national facilities, facilities of local governments, facilities of fire departments, police department facilities, facilities of the Japan Coast Guard, facilities of the Japan Self-Defense Forces, and facilities of nearby plants can be mentioned.

The data acquisition unit 80 acquires data supplied from the external facilities of the computer system 4 via the interface unit 11. The interface unit 11 functions as a data supply unit that supplies data from the computer system 4 to the external devices.

The data acquisition unit 80 includes an arrangement-status-data acquisition unit 85 that acquires arrangement status data.

The arrangement-status-data acquisition unit 85 can acquire arrangement status data indicating each arrangement status of a plurality of articles. The arrangement-status-data acquisition unit 85 acquires the arrangement status data, for example, from the input device 20. For example, the arrangement status data is acquired (collected) by a worker. The worker acquires the arrangement status data via a communication device (including a telephone and a fax machine) capable of communicating with the external facilities of the plant 1. The worker can operate the input device 20 to supply the arrangement status data to the arrangement-status-data acquisition unit 85 via the interface unit 11. The worker can supply the arrangement status data to the arrangement-status-data acquisition unit 85 by operating the mobile terminal 9. A communication device capable of communicating with the external facilities of the plant 1 can be connected to the computer system 4 and supply the arrangement status data to the arrangement-status-data acquisition unit 85 via the communication device. The arrangement status data can be supplied to the arrangement-status-data acquisition unit 85 via a network.

The arrangement status data includes target amount data indicating a target amount of articles, and expected arrival time data indicating an expected time of arrival of the articles to the plant 1.

The arrangement status data includes position data indicating the position of the transport vehicle 30 that transports the articles to the plant 1. The arrangement status data (position data) is acquired from the position detection device 22.

The arrangement status data includes actual amount data indicating a secured amount of arranged articles.

The arrangement status data also includes traffic data indicating a status of a transport route of the transport vehicle (transport means) 30, and the planned route data indicating a planned route of the transport vehicle 30.

The storage unit 15 stores therein data required for planning of article arrangement. The display control unit 18 controls the display device 5. The display control unit 18 processes data supplied from the interface unit 11 to generate image data to be displayed on the display device 5.

The determination unit 16 determines whether specific articles to be supplied to the plant 1 from a first supply source (first supplier) will arrive at an expected time. When the specific articles are supplied from the first supply source by the transport vehicle 30, the determination unit 16 determines whether the specific articles to be supplied from the first supply source to the plant 1 will arrive at the expected time, based on the position data of the transport vehicle 30 that transports specific articles and the traffic data indicating the status of the road on which the transport vehicle 30 is to travel (congestion status, damage status, and the like).

The traffic data includes route data (road data) indicating a status of a road on which the transport vehicle 30 is to travel. The road data includes a road map, traffic congestion information, and disaster information of a road. As described above, the transport means 30 is not limited to transport vehicles. When the transport means 30 is railways, the traffic data includes route data (railway track data) indicating a status of a railway track on which a railway train is to travel. The railway track data includes a track map, service information, and failure information of the track. When the transport means 30 is aircrafts, the traffic data includes route data (air route data) indicating a status of an air route through which an aircraft is to fly. When the transport means 30 is marine vessels, the traffic data includes route data (water route data) indicating a status of a water route through which the vessel is to be navigated.

When the determination unit 16 determines that the specific articles will not arrive at the expected time, the instruction unit 130 outputs an instruction signal so that the specific articles are supplied from the second supply source (second supplier). The instruction signal output from the instruction unit 130 is supplied to the display control unit 18. The display control unit 18 cancels the supply of the articles from the first supply source, and causes the display device 5 to display an image or characters corresponding to the instruction signal so that the articles are supplied from the second supply source. Accordingly, the manager can arrange so that the articles are supplied from the second supply source. If the secured amount of the articles is insufficient with respect to the target amount, arrangement can be made so that the articles are supplied from two or more supply sources.

The database unit 19 stores therein the article data and the arrangement status data. The database unit 19 stores therein plant data supplied from the plant system 31, the scenario data generated by the simulation unit 17, and the display data generated by the display control unit 18. The database unit 19 also stores therein data from the sub-system 33, the input device 20, and the communication device 21.

Figure 20:
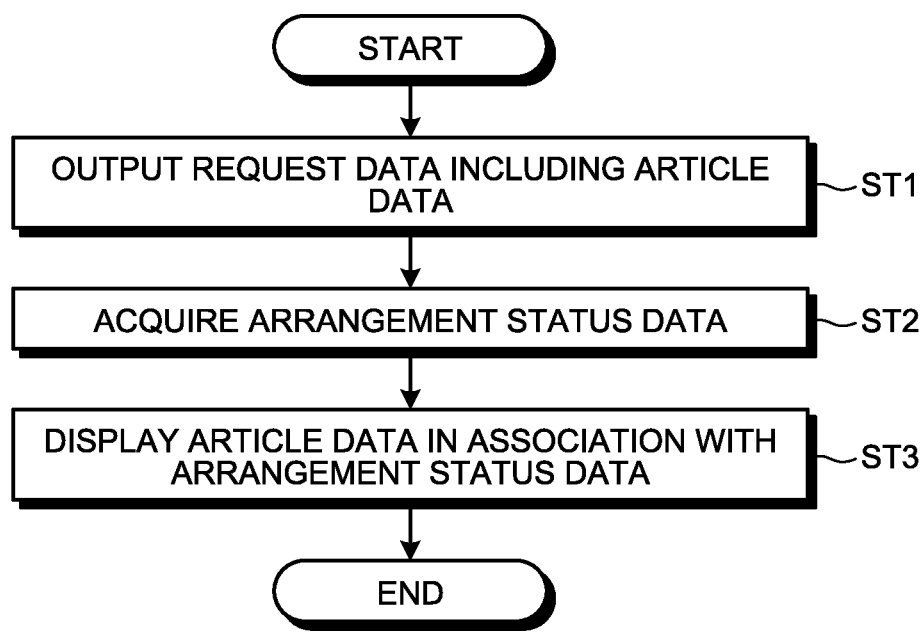
FIG. 20 is a flowchart illustrating an example of an article-arrangement planning method according to the fifth embodiment.

Next, an example of an article-arrangement planning method according to the present embodiment is described with reference to a flowchart in FIG. 20.

If a disaster such as a severe accident has occurred in the plant 1, and relief supplies (articles) are required in the plant 1, request data is output from the plant 1 to external facilities (Step ST1). The request data includes article data indicating articles required in the plant 1, target amount data indicating a target amount of the articles, and desired arrival time data indicating a desired arrival time of the articles. A manager of the plant 1 inputs the request data to the input device 20. The request data includes an advance request value determined for each developmental event. The request data is transmitted to the arrangement-status management unit 24 via the interface unit 11 and the communication device 21. A manager of the external facilities having acquired the request data via the arrangement-status management unit 24 arranges the articles based on the request data so that the requested articles are supplied to the plant 1.

The request data does not necessarily need to be output. The manager of external facilities may autonomously start transport of articles.

Transport of articles is started. The arrangement-status-data acquisition unit 85 acquires arrangement status data indicating each arrangement status of the articles (Step ST2). As described above, the arrangement status data can be acquired via the input device 20, via the mobile terminal 9, via the communication device, or via the network.

The display control unit 18 causes the display device 5 to display the article data indicating the articles. In the present embodiment, the display control unit 18 causes the display device 5 to display the article data in association with the arrangement status data (Step ST3).

FIG. 21 is a diagram illustrating an example of the display device 5 according to the present embodiment. As illustrated in FIG. 21, the display device 5 displays the article data in association with the arrangement status data.

The article data is data indicating articles arranged in the plant 1 in case of emergency of the plant 1. The article data is data indicating types of articles (article names).

The arrangement status data includes target amount data indicating a target amount of articles, and expected arrival time data indicating an expected time of arrival of the articles to the plant 1.

The arrangement status data includes actual amount data indicating a secured amount of arranged articles.

The arrangement status data also includes affiliation data indicating a supply source of the articles (external facilities).

In the example illustrated in FIG. 21, as the affiliation data, the Japan Self-Defense Forces, a fire department, a police department, a local government, and the Japan Coast Guard are illustrated. As the article data, fuel, drinking water, medical goods, pump trucks for fire extinguishing, power-supply vehicles, personnel, and workers are illustrated. The display control unit 18 causes the display device 5 to display the affiliation data and the article data in association with each other. Accordingly, it can be quickly recognized which article is to be arranged and which external facility the article is transported from.

Further, the display control unit 18 causes the display device 5 to display the article data and the arrangement status data (the target amount data and the expected arrival time data) in association with each other. Accordingly, it can be quickly recognized which article is required how many, which article is to arrive, and when the article will arrive. Further, the display control unit 18 causes the display device 5 to display the actual amount data indicating the secured amount of the actually arranged articles. Accordingly, it can be quickly recognized which article is being supplied how many.

Figure 22:
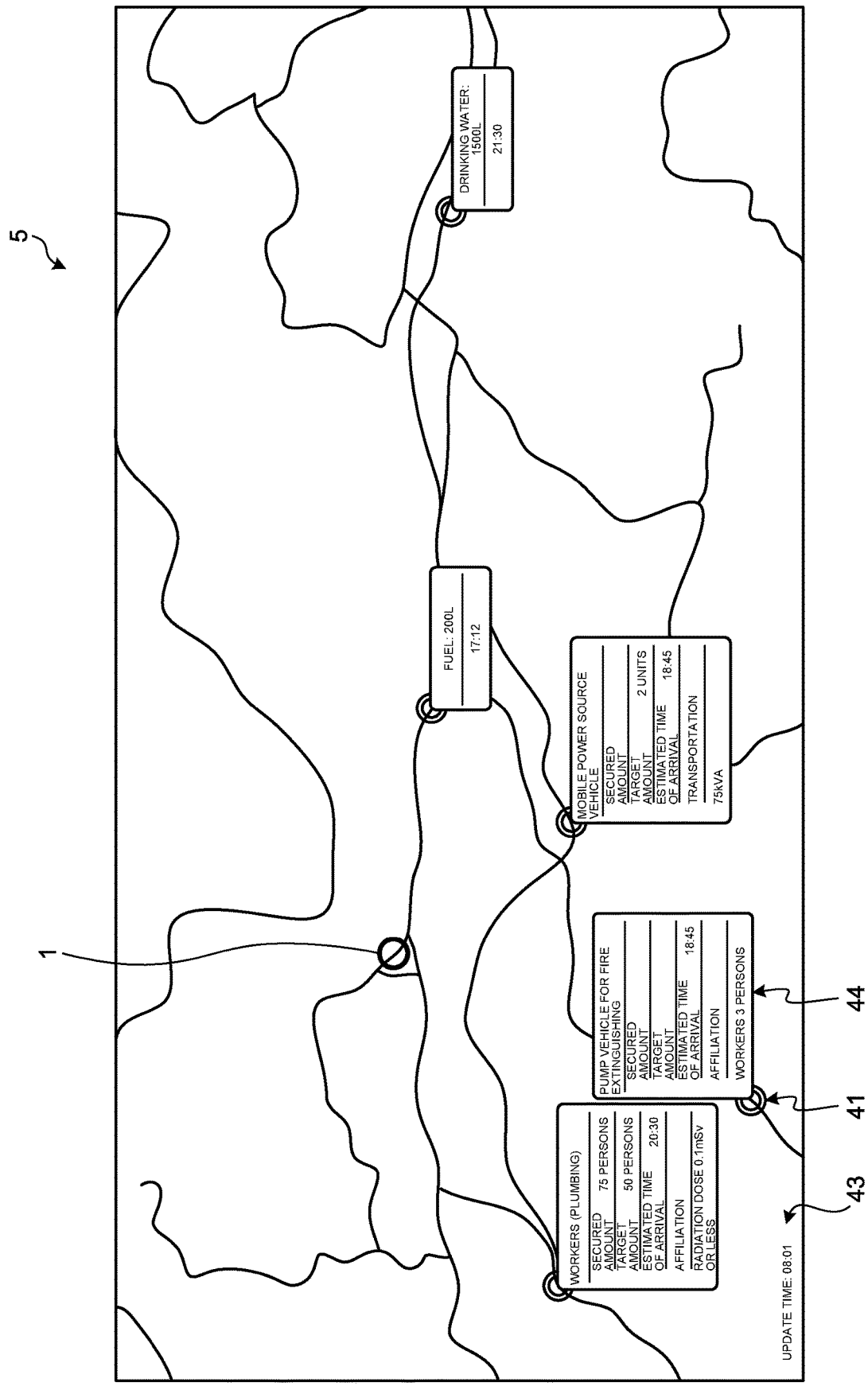
FIG. 22 is a diagram illustrating an example of the display device according to the fifth embodiment.

FIG. 22 is a diagram illustrating an example of the display device 5 according to the present embodiment. As illustrated in FIG. 22, the display control unit 18 causes the display device 5 to display item data 44 in which the article data is displayed in association with the arrangement status data. The item data 44 includes article data (a pump truck for fire extinguishing and the like), actual amount data (a secured amount), target amount data (a target amount), expected arrival time data (an expected arrival time), and affiliation data (affiliation). The item data 44 also includes traffic data indicating the status of the transport route of the transport means 30, and planned route data indicating the planned route of the transport means 30.

The arrangement status data includes position data indicating the position of the transport vehicle 30 that transports the articles to the plant 1. In the present embodiment, the position data of the transport vehicle 30 is illustrated by an icon 41. FIG. 22 illustrates an example in which five transport vehicles 30 are traveling toward the plant 1.

The display control unit 18 causes the display device 5 to display the position data and the item data 44 in association with each other. Accordingly, it can be quickly recognized which transport vehicle 30 is transporting articles, and what articles and how many articles the transport vehicle 30 is transporting. Further, it can be quickly recognized which transport vehicle 30 is currently located where and when it will arrive.

Further, the display control unit 18 causes the display device 5 to display the planned route data of the transport means 30, the position data, and the item data 44 in association with each other. Accordingly, it can be quickly recognized on which route the transport means 30 is traveling to arrive at a destination. At this time, a route change can be studied based on the traffic data.

The display control unit 18 causes the display device 5 to display the position data of the transport means 30 on a real-time basis. The display control unit 18 sequentially updates the position data of the transport means 30 to the latest position data and causes the display device 5 to display the latest position data of the transport means 30. Further, the display control unit 18 causes the display device 5 to display update time data 43 indicating the update time at which the position data of the transport means 30 has been updated.

The determination unit 16 determines, for example, whether the drinking water to be supplied from the first supplier to the plant 1 arrives at an expected time. When it is determined that the drinking water will not arrive at the expected time, the instruction unit 130 outputs an instruction signal so that the drinking water will be supplied from the second supplier. A manager watching the display device 5 illustrated in FIG. 22 can instruct a change from the first supplier to the second supplier. Accordingly, the plant 1 can obtain the drinking water quickly.

As described above, according to the present embodiment, the display control unit 18 causes the display device 5 to display the article data in association with the arrangement status data. Accordingly, the manager of the plant 1 can perform planning to quickly arrange necessary and sufficient articles based on the display result on the display device 5.

According to the present embodiment, the arrangement status data includes not only the target amount data indicating the target amount of the articles and the expected arrival time data indicating the expected time of arrival of the articles to the plant 1, but also the position data indicating the position of the transport vehicle 30 that transports the articles to the plant 1. Accordingly, planning to arrange the necessary and sufficient articles quickly can be performed based on the display result including the position data on the display device 5.

Further, according to the present embodiment, if it is determined that the articles from the first supplier will not arrive at the expected time, it is arranged that specific articles will be supplied from the second supplier. Accordingly, necessary articles can be obtained quickly.

Further, when it is determined that the articles from the supply source will not arrive at the expected time, or when the secured amount of the arranged articles is not sufficient with respect to the target amount, separate arrangement can be performed.

Sixth Embodiment

A sixth embodiment is described. In the following descriptions, constituent elements like or equivalent to those in the above embodiments are denoted by like reference signs and descriptions thereof will be simplified or omitted.

Figure 23:
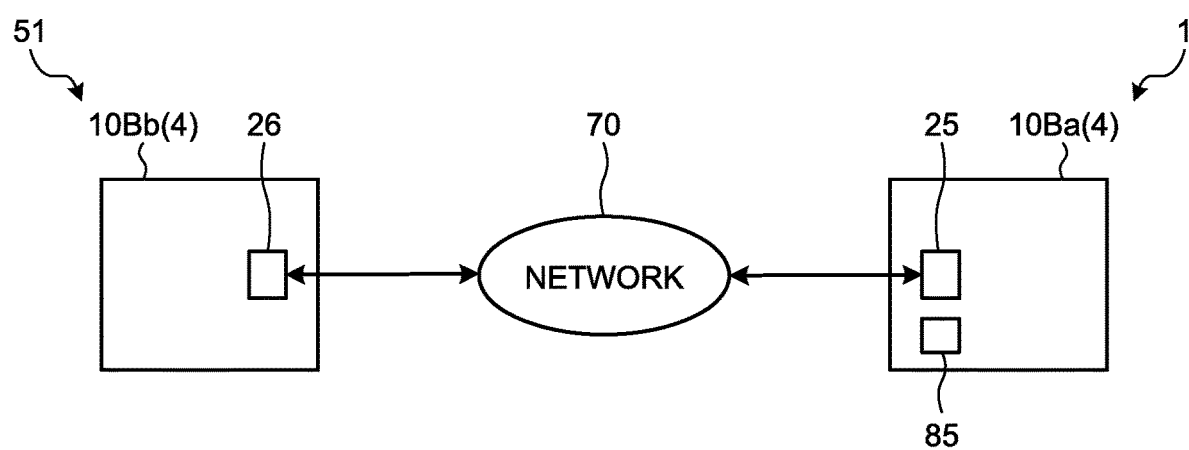
FIG. 23 is a diagram illustrating an example of an article-arrangement planning system according to a sixth embodiment.

FIG. 23 is a diagram illustrating an example of an article-arrangement planning system according to the present embodiment. In the present embodiment, the article-arrangement planning system includes an article-arrangement planning system 10Ba (the computer system 4) placed in the plant 1 and an article-arrangement planning system 10Bb (the computer system 4) placed in an external facility 51. The article-arrangement planning system 10Ba and the article-arrangement planning system 10Bb can perform data communication with each other via a network 70.

The computer system 4 placed in the plant 1 includes a transmission unit 25 that outputs request data for requesting arrangement of articles. As described in the above embodiments, the request data includes the article data indicating articles required in the plant 1, the target amount data indicating the target amount of the articles, and desired arrival time data indicating a desired arrival time of the articles. The transmission unit 25 includes, for example, the communication device 21 described in the above embodiments.

The computer system 4 placed in the external facility 51 includes a reception unit 26 that receives the request data transmitted from the transmission unit 25 via the network 70. The reception unit 26 includes, for example, the arrangement-status management unit 24 described in the above embodiments.

A manager of the external facilities 51 arranges articles based on the request data received by the reception unit 26 of the external facility 51.

According to the present embodiment, the arrangement status data indicating the arrangement status of the articles is transmitted from the computer system 4 of the external facility 51 to the arrangement-status-data acquisition unit 85 of the computer system 4 placed in the plant 1 via the network 70.

As described above, according to the present embodiment, the manager of the plant 1 can recognize the arrangement status of the articles via the network 70. Accordingly, arrangement planning of the necessary and sufficient articles can be performed.

Seventh Embodiment

A seventh embodiment is described. In the following descriptions, constituent elements like or equivalent to those in the above embodiments are denoted by like reference signs and descriptions thereof will be simplified or omitted.

Figure 24:
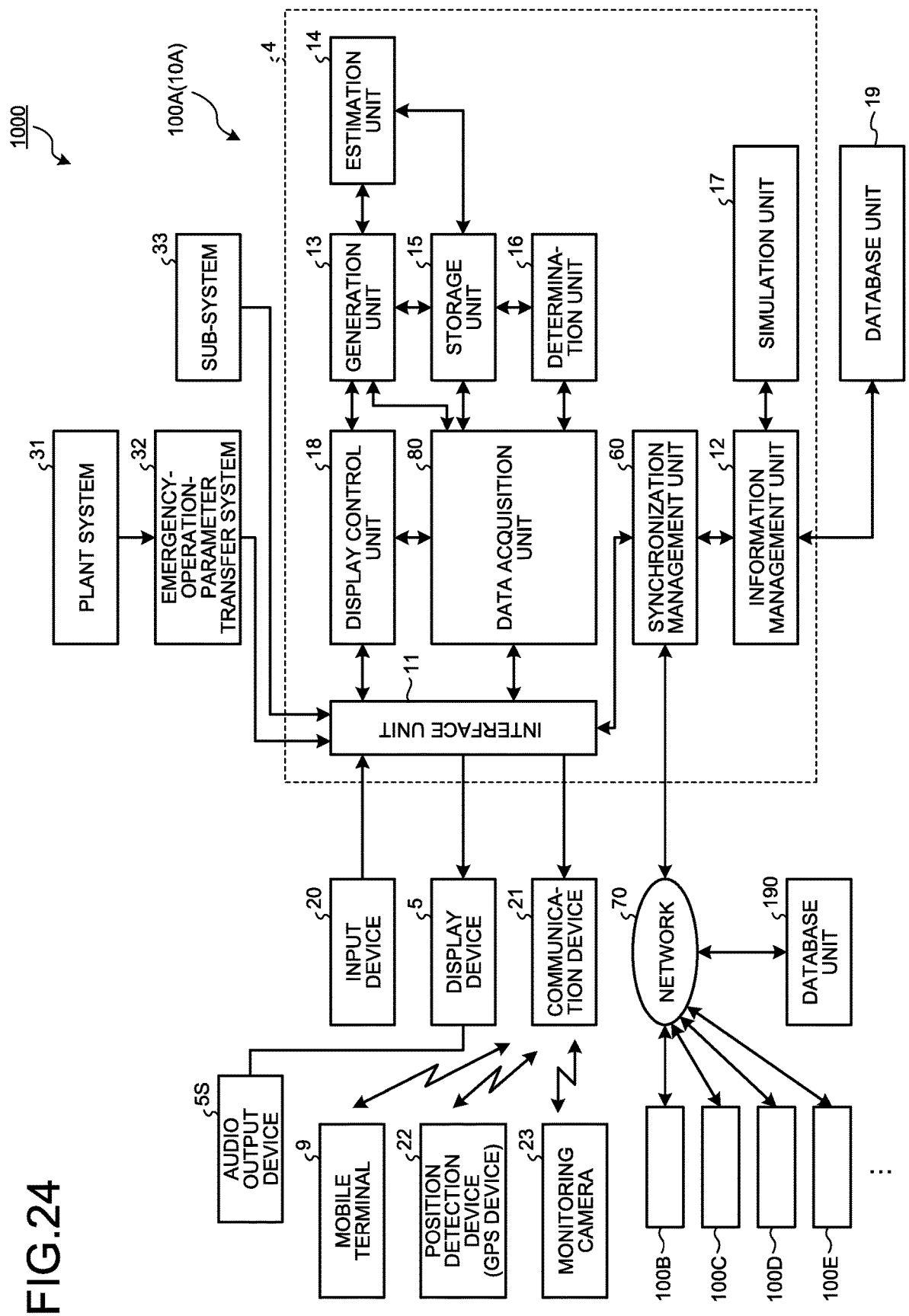
FIG. 24 is a diagram illustrating an example of a decision-making support system according to a seventh embodiment.
Figure 25:
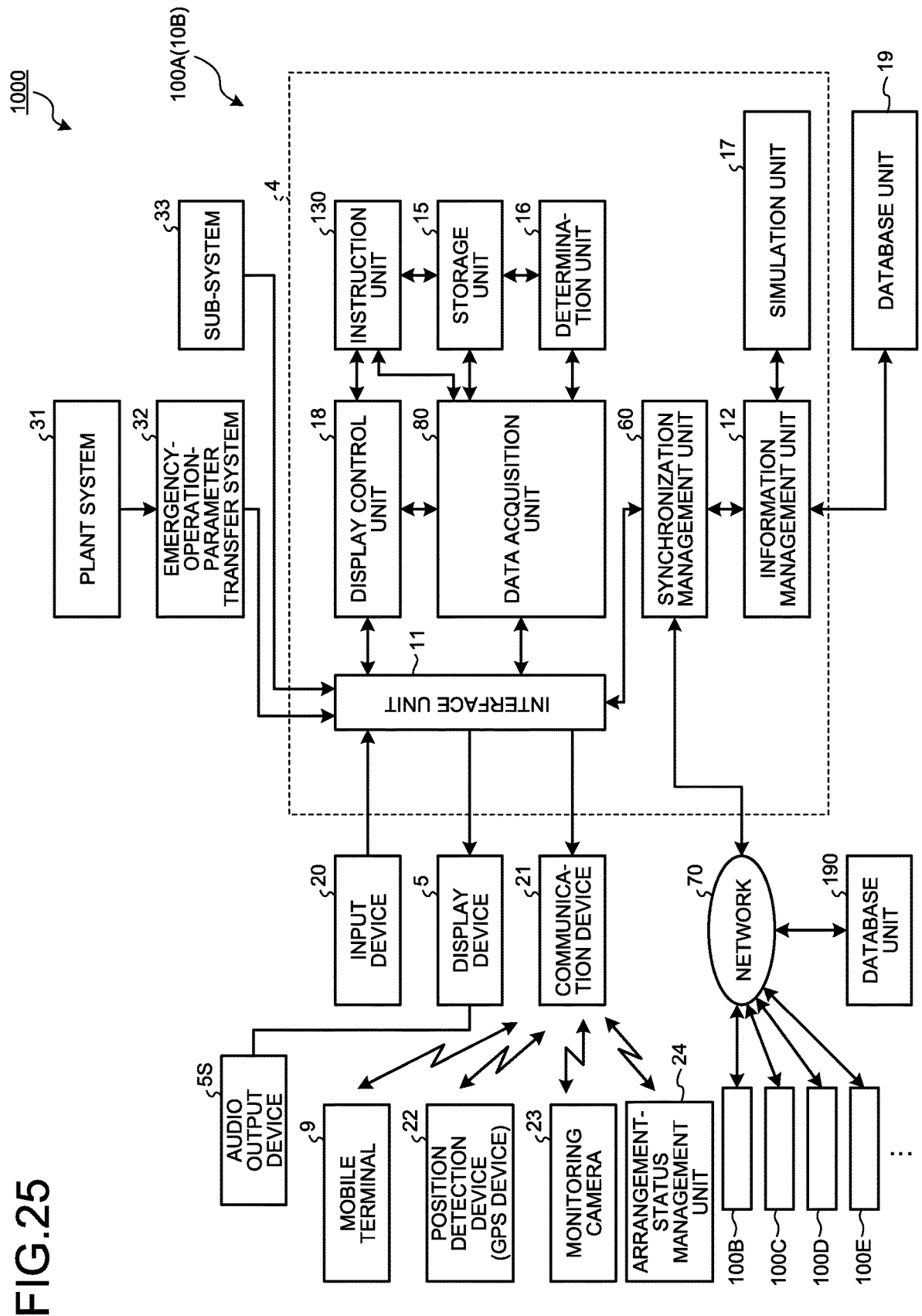
FIG. 25 is a diagram illustrating an example of the decision-making support system according to the seventh embodiment.

FIGS. 24 and 25 are diagrams illustrating an example of the decision-making support system 100 according to the present embodiment. The decision-making support system 100 supports decision making of measures in case of emergency. FIG. 24 illustrates a decision-making support system 100A including the route planning system 10A described in the above embodiments. FIG. 25 illustrates the decision-making support system 100A including the article-arrangement planning system 10B described in the above embodiments.

As illustrated in FIGS. 24 and 25, a plurality of decision-making support systems of the decision-making support system 100A, a decision-making support system 100B, a decision-making support system 100C, a decision-making support system 100D, and a decision-making support system 100E are connected so as to be able to perform data communication with each other via the network 70. A nuclear-reactor comprehensive disaster network is constructed by the plurality of decision-making support systems (100A, 100B, 100C, 100D, and 100E) connected with each other via the network 70. The network (the nuclear-reactor comprehensive disaster network) 70 is used at the time of comprehensive disasters involved with the nuclear reactor. Each of the decision-making support systems (100A, 100B, 100C, 100D, and 100E) has the same configuration as the decision-making support system 100 described in the above embodiments. FIG. 24 and FIG. 25 respectively illustrate an example in which five decision-making support systems (100A, 100B, 100C, 100D, and 100E) are provided. The number of decision-making support systems connected with each other via the network 70 is arbitrary.

The decision-making support system 100A is placed, for example, in a nuclear power generation plant. The decision-making support system 100B is placed, for example, in an electric power company. The decision-making support system 100C is placed, for example, in relevant departments of a local government. The decision-making support system 100D is placed, for example, in relevant departments of the government. The government includes at least one of a government policy organization, a regulatory agency, and an off-site center. The decision-making support system 100E is placed, for example, in a plant manufacturer.

In the following descriptions, if it is not required to distinguish the respective decision-making support systems (100A, 100B, 100C, 100D, and 100E), these are simply referred to as "decision-making support system 100".

In the present embodiment, each of the decision-making support systems 100 includes a synchronization management unit 60. The synchronization management unit 60 is connected to the interface unit 11 and the information management unit 12 respectively. The synchronization management unit 60 is connected to the network 70. The synchronization management unit 60 of a certain decision-making support system 100 of the decision-making support systems 100 shares data with the synchronization management units 60 of other decision-making support systems 100. The synchronization management unit 60 performs transmission and reception of data, and update of data through the network 70.

When being disconnected from the network 70 and then reconnected to the network 70 again after passage of a predetermined time, the synchronization management unit 60 of the certain decision-making support system 100 updates data based on the data received from the synchronization management units 60 of other decision-making support systems 100. The decision-making support systems 100 can share data via the network 70.

In the present embodiment, a database unit 190 connected to the network 70 is provided. The respective decision-making support systems 100 share data with the database unit 190 via the network 70.

The information management unit 12 causes the display control unit 18 to generate display data based on abnormal condition data required in case of emergency. The abnormal condition data includes data required for decision making. The information management unit 12 shares abnormal condition data via the network 70. That is, the information management unit 12 of a certain decision-making support system 100 of the decision-making support systems 100 shares the abnormal condition data with information management units 12 of other decision-making support systems 100. The information management unit 12 performs transmission and reception of the abnormal condition data, and update of the abnormal condition data via the network 70.

The abnormal condition data includes data described below.

(1) Personnel-resource management information—input from the input device 20

(2) Logistic support (relief goods transport) information—input from the input device 20

(3) Radiation monitoring (periphery, in a plant, and in a building) information—input from the monitoring post via the network 70

(4) Weather information, wind direction information, earthquake information, and tsunami information—input via the network 70

(5) Damage status (camera image, landslide, restoration status) information in a plant—input from the input device 20, the mobile terminal 9, and the monitoring camera 23 via the interface unit 11

(6) Plant reactor-core information (fuel temperature, temperature in a reactor, pressure in a reactor, and the like)—input from the emergency-operation-parameter transfer system 32

(7) Progress estimation information of a plant status—input from the simulation unit 17

(8) Electric power transmission information around the plant—input from an electric power company via the network 70

(9) Response status (status of a portable facility) information in the plant—input from the input device 20

(10) Information of documents obligated to be stored such as design drawings of a nuclear reactor—input from the database unit 190 via the network 70

(11) Task management information—input from the input device 20

(12) Fax image information and the like—input from the input device 20

In the present embodiment, the information management unit 12 selects the abnormal condition data required for decision making, among a plurality of pieces of abnormal condition data, and generates display data by using the selected abnormal condition data. The information management unit 12 of a certain decision-making support system 100 shares the display data with other decision-making support systems 100 via the network 70.

Each of the decision-making support systems (100A, 100B, 100C, 100D, and 100E) is placed in different parties concerned. The parties concerned include a nuclear power generation plant, an electric power company, a local government, the government, and a plant manufacturer. The abnormal condition data required for decision making of each of the decision-making support systems (100A, 100B, 100C, 100D, and 100E) is different from each other in many cases.

In the present embodiment, the information management units 12 of the respective decision-making support systems (100A, 100B, 100C, 100D, and 100E) select the abnormal condition data having a high priority, among the plurality of pieces of abnormal condition data, based on the priority of the abnormal condition data set in advance and cause the display control unit 18 to generate display data by using the selected abnormal condition data.

The abnormal condition data to be selected includes the latest data. The latest data includes real time data. The abnormal condition data is input to the information management unit 12 on a real-time basis. The database unit 190 stores therein the abnormal condition data in association with the time at which emergency data is input. The information management unit 12 causes the display control unit 18 to generate display data by using the latest data. The display device 5 displays the display data generated by using the latest data.

The abnormal condition data to be selected includes the abnormal condition data satisfying a priority display standard. The abnormal condition data satisfying the priority display standard includes the abnormal condition data having a high risk and the abnormal condition data having high importance. The information management unit 12 causes the display control unit 18 to generate display data by using the abnormal condition data satisfying the priority display standard. The display device 5 displays the display data generated by using the abnormal condition data satisfying the priority display standard.

The abnormal condition data satisfying the priority display standard includes, for example, plant data having been changed at a change rate exceeding a reference value set in advance in the plant 1. The plant data includes, for example, fuel temperature data indicating a fuel temperature having been changed at a change rate exceeding a reference value set in advance, reactor temperature data indicating the temperature in the reactor having been changed at a change rate exceeding a reference value, and reactor pressure data indicating the pressure in the reactor having been changed at a change rate exceeding a reference value. The display device 5 displays display data generated based on the plant data including the fuel temperature data, the reactor temperature data, and the reactor pressure data.

The abnormal condition data satisfying the priority display standard includes peripheral data (weather data and the like) having been changed at a change rate exceeding a reference value set in advance. The peripheral data includes, for example, rainfall amount data indicating a rainfall amount having been changed at a change rate exceeding a reference value set in advance, wind speed data indicating a wind speed having been changed at a change rate exceeding a reference value, and seismic intensity data indicating the intensity of an earthquake having been changed at a change rate exceeding a reference value. The display device 5 displays display data generated based on the peripheral data including the rainfall amount data, the wind speed data, and the seismic intensity data.

The abnormal condition data satisfying the priority display standard can include data supplied from an organization (for example, the government) designated in advance.

When the information management unit 12 causes the display device 5 to display the display data generated based on the abnormal condition data satisfying the priority display standard, the information management unit 12 can highlight the display data based on the priority (the degree of importance). As described above with reference to FIG. 5, highlighting includes, for example, pop-up display in which display data is pop-up displayed.

The information management unit 12 can cause the display control unit 18 to generate display data organized for each item of the measures based on the abnormal condition data required for decision making. The display device 5 displays the organized display data. The items of the measures include the following items.
(1) Evacuation timing
(2) Evacuation route
(3) Evacuation site
(4) Work procedure
(5) Personnel distribution
(6) Worker's route
(7) Power source route
(8) Type and number of goods to be transported The database unit 190 stores therein a plurality of pieces of abnormal condition data. The information management unit 12 selects the abnormal condition data required for deciding the items of the respective measures, among the pieces of abnormal condition data stored in the database unit 190, and causes the display control unit 18 to generate display data by using the selected abnormal condition data. The display device 5 displays the display data.

The abnormal condition data to be selected includes estimation data generated by estimating and calculating a chronological change of the abnormal condition data. The simulation unit 17 estimates and calculates the chronological change of the plant data collected by the information management unit 12 to generate plant estimation data. The information management unit 12 causes the display control unit 18 to generate display data by using the plant estimation data generated by the simulation unit 17. The display device 5 displays the display data.

If a severe accident occurs in the plant 1, the information management unit 12 acquires the required plant data (abnormal condition data) from the plant system 31. The information management unit 12 acquires the required peripheral data (abnormal condition data) from the sub-system 33. The information management unit 12 also acquires various types of abnormal condition data via the network 70.

The information management unit 12 causes the display control unit 18 to generate display data based on the acquired abnormal condition data. The information management unit 12 can cause the display control unit 18 to generate the display data by processing the information input from the input device 20. The display device 5 displays the generated display data.

In an example illustrated in FIG. 24, the decision-making support system 100 includes the route planning system 10A and the information management unit 12 that shares the abnormal condition data required in case of emergency via the network 70, described in the above embodiments. The abnormal condition data includes the alternative route data generated by the generation unit 13. Accordingly, the parties concerned can share the data on the route in the plant 1. Because the abnormal condition data including the alternative route data is shared by the parties concerned, decision making can be effectively supported by using the abnormal condition data.

In an example illustrated in FIG. 25, the decision-making support system 100 includes the article-arrangement planning system 10B and the information management unit 12 that shares the abnormal condition data required in case of emergency via the network 70, described in the above embodiments. The abnormal condition data includes the arrangement status data. Accordingly, the parties concerned can share the data on the article arrangement in the plant 1. Because the abnormal condition data including the arrangement status data is shared by the parties concerned, decision making can be effectively supported by using the abnormal condition data.

In the above embodiments, it is assumed that the decision-making support system 100 is applied to a nuclear power generation plant. The decision-making support system 100 can be also applied to at least one of a thermal power generation plant, a chemical plant, and an environmental plant.

The decision-making support system 100 can be applied not only to a disaster of the plant 1, but also to disasters occurring in an urban area due to a natural phenomenon such as an earthquake, a typhoon, and a tsunami. The decision-making support system 100 can be also applied to disasters such as an airplane crash, and a missile attack.

In the above embodiments, it is assumed that the decision-making support system 100 is used at the time of occurrence of an actual accident or a disaster. The decision-making support system 100 can be applied to a training performed in the plant 1 to prepare for an accident or a disaster. The decision-making support system 100 can be applied to a training performed by the government or a local government to prepare for an accident or a disaster.

That is, in the above embodiments, a case of emergency or a case of abnormal conditions is a concept including the cases of an abnormal operation of the plant 1, occurrence of an accident, occurrence of a disaster, and a training assuming occurrence of an accident or a disaster.

Eighth Embodiment

An eighth embodiment is described. In the following descriptions, constituent elements like or equivalent to those in the above embodiments are denoted by like reference signs and descriptions thereof will be simplified or omitted.

In the above embodiments, it is assumed that the decision-making support system 100 including the route planning system 10A is applied to plant facilities. The route planning system 10A can be applied not only to plant facilities, but also to various applicable targets, for example, traffic facilities such as motorways or railways, or building facilities such as condominium buildings or commercial facilities.

An example in which the route planning system 10A is applied to traffic facilities including motorways is described below.

If an abnormality occurs in an existing facility of the traffic facilities, the route planning system 10A plans a route for moving a support facility from the standby position PJ1 to the predetermined position PJ2 for support in order to support the existing facility by the support facility.

Motorways, traffic lights, and guardrails are exemplified as the existing facility in the traffic facilities. A collapse on a road surface of a motorway, an accident on a motorway, a failure of traffic lights, and a breakage of guardrails are exemplified as the abnormality of the existing facility in the traffic facilities.

The support facility includes various facilities that can handle an abnormality in the existing facility. The support facility is a movable body. For example, as the support facility when the road surface of the motorway has collapsed, a transport vehicle that transports a construction machine to repair the motorway and materials (gravels, an asphalt material, and the like) to repair the collapse is exemplified. As the support facility when an accident occurs on the motorway, ambulances, fire engines, police cars, maintenance service vehicles, tow trucks, crane trucks, helicopter ambulances, vehicles for the Japan Self-Defense forces, buses, food transport vehicles, and fuel transport vehicles are exemplified. As the support facility when the traffic lights are broken, police cars, high-place service vehicles, self-propelled signature cars, and transportable traffic lights are exemplified. As the support facility when the guardrail is broken, construction vehicles to repair the guardrail, police cars, and self-propelled signature cars are exemplified.

In the present embodiment, an example of planning a route for the support facility at the time of occurrence of an accident on a motorway is described. An example in which the support facility is a support vehicle 6H that can handle an accident is described. In the present embodiment, the support vehicle 6H includes a maintenance service vehicle (a vehicle of Type: A), a tow truck (a vehicle of Type: B), and a crane truck (a vehicle of Type: C). The maintenance service vehicle is a service vehicle that transports workers who work at an accident site, or performs site maintenance activity so that a secondary damage does not occur at the accident site.

The support vehicle 6H stands by at the standby position PJ1. As the standby position PJ1, for example, a car park of a motorway management company provided near an interchange of a motorway is exemplified. The predetermined position PJ2 is an accident site. The basic route La for moving the support vehicle 6H from the standby position PJ1 to the predetermined position PJ2 is decided in advance.

For example, there is a possibility that the support vehicle 6H is not able to pass through the basic route La due to occurrence of a traffic congestion or a disaster. If such a status that the support vehicle 6H cannot pass through the basic route La occurs, the route planning system 10A plans the alternative route Lb for moving the support vehicle 6H to the predetermined position PJ2.

As described above with reference to FIG. 6, the data acquisition unit 80 includes the route-status-data acquisition unit 81, the area-status-data acquisition unit 82, the position-data acquisition unit 83, and the priority-data acquisition unit 84.

The route-status-data acquisition unit 81 acquires the route status data indicating the status of the basic route La. The route status data includes at least one of traffic congestion data indicating a traffic congestion status of the basic route La, damage data indicating a damage status at a specific position in the basic route La, and restoration data indicating a restoration status of the damage. The traffic congestion data can be acquired from an existing Vehicle Information and Communication System. SNS (Social Networking Service) data indicating a status of the basic route La transmitted from the general public by using the SNS can be acquired by the route-status-data acquisition unit 81.

The area-status-data acquisition unit 82 acquires the area status data indicating the status of the area of the accident site being the predetermined position PJ2. For example, a worker of a motorway management company happened to be at the site of an accident can transmit the area status data to the area-status-data acquisition unit 82 by using the mobile phone. The SNS data indicating the status of the area of the accident site transmitted from a person happened to be at the site of an accident can be acquired by the area-status-data acquisition unit 82. If a monitoring camera is provided on the motorway, image data acquired by the monitoring camera that has captured the image of the accident site can be acquired by the area-status-data acquisition unit 82.

The position-data acquisition unit 83 acquires position data indicating the position of the support vehicle 6H.

The generation unit 13 generates alternative route data indicating the alternative route Lb for moving the support vehicle 6H to the predetermined position PJ2 based on the route status data acquired by the route-status-data acquisition unit 81.

The estimation unit 14 estimates one or both of the moving time required for the support vehicle 6H passing through the alternative route Lb generated by the generation unit 13 to arrive at the predetermined position PJ2 and the moving time thereof.

The storage unit 15 stores therein data required for planning of the route of the support vehicle 6H. The storage unit 15 stores therein the track data indicating the road on which the support vehicle 6H travels and the basic route data indicating the basic route La.

The basic route data or the alternative route data is output to a mobile terminal held by a worker who drives the support vehicle 6H. The worker of the support vehicle 6H drives the support facility from the standby position PJ1 to the predetermined position PJ2 while watching the basic route data or the alternative route data displayed on the display device of the mobile terminal.

An example of a route planning method according to the present embodiment is described next. If an accident occurs on a motorway, the route-status-data acquisition unit 81 acquires the route status data. The determination unit 16 or the manager determines whether the support vehicle 6H can pass through the basic route La based on the route status data.

Figure 26:
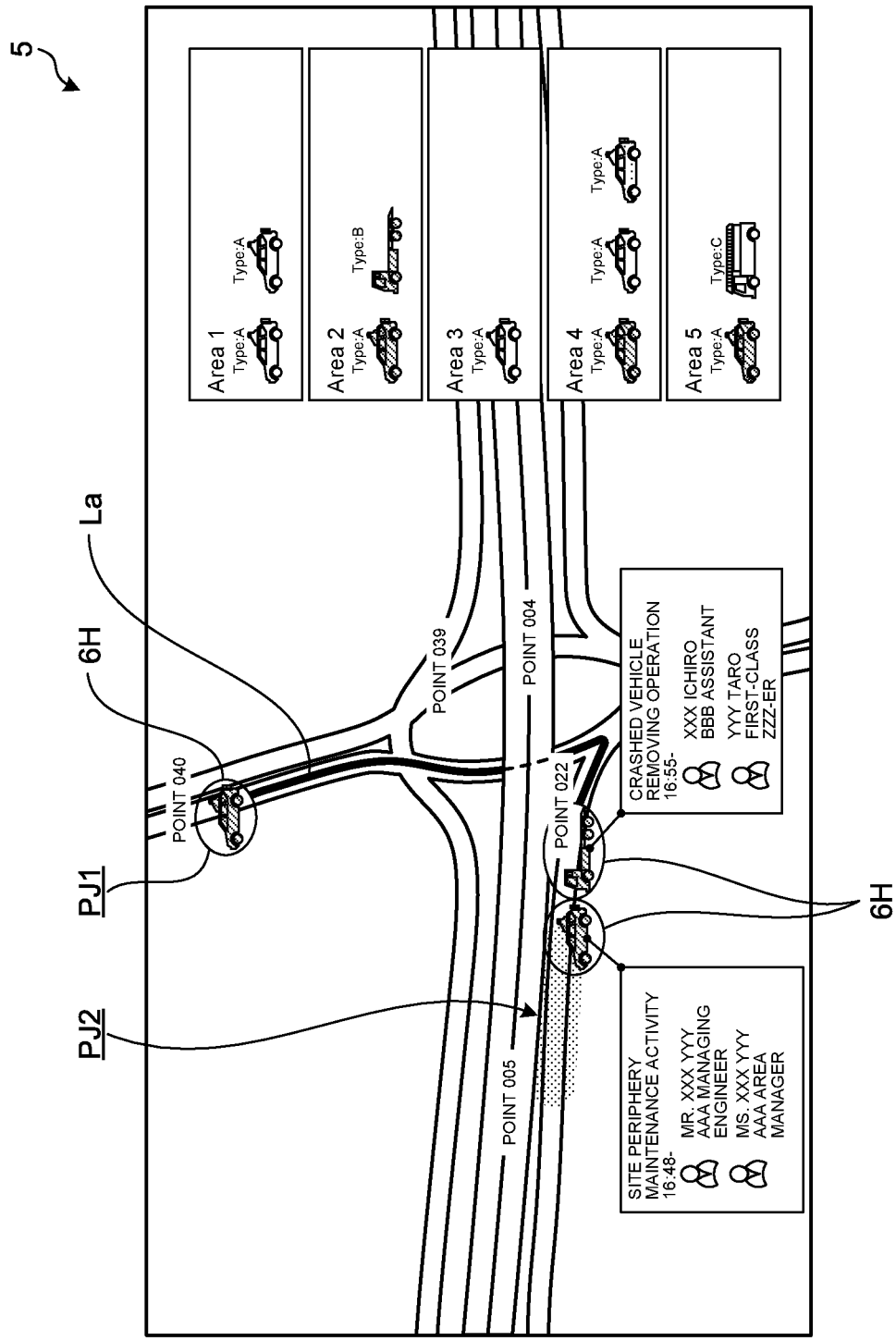
FIG. 26 is a diagram illustrating an example of a display device according to an eighth embodiment.

If it is determined that the support vehicle 6H can pass through the basic route La, the basic route data indicating the basic route La is displayed on the display device 5. FIG. 26 is a diagram illustrating an example of the display device 5 that displays the basic route data. As illustrated in FIG. 26, the display device 5 displays the basic route data indicating the basic route La together with map data of the vicinity of the accident site.

A car park of a motorway management company, which is the standby position PJ1, is present in a plurality of places. As illustrated in FIG. 26, in the present embodiment, a list of the plurality of standby positions PJ1 near the accident site and the support vehicles 6H standing by at the respective standby positions PJ1 is displayed. In an example illustrated in FIG. 26, the display control unit 18 causes the display device 5 to display the display data indicating that two maintenance service vehicles (Type: A) are standing by in "Area 1" indicating a first standby position PJ1, one maintenance service vehicle (Type: A) and one tow truck (Type: B) are standing by in "Area 2" indicating a second standby position PJ1, one maintenance service vehicle (Type: A) is standing by in "Area 3" indicating a third standby position PJ1, three maintenance service vehicles (Type: A) are standing by in "Area 4" indicating a fourth standby position PJ1, and one maintenance service vehicle (Type: A) and one crane truck (Type: C) are standing by in "Area 5" indicating a fifth standby position PJ1.

The route planning system 10A allocates the most appropriate support vehicle 6H from the support vehicles 6H based on the status of the accident site. The route planning system 10A outputs the basic route data so as to connect the standby positions PJ1 where the allocated support vehicles 6H are standing by and the predetermined position PJ2 indicating the accident site to each other.

The basic route data and the route status data are transmitted from the computer system 4 to the mobile terminals held by the workers who drive the allocated support vehicles 6H. The basic route data and the route status data are transmitted wirelessly to the mobile terminals mounted on the support vehicles 6H. The worker receives an instruction to move the support vehicle 6H to the predetermined position PJ2 via the mobile terminal. The worker can drive the support vehicle 6H so that the support vehicle 6H is carried to the predetermined position PJ2 passing through the basic route La, while watching the basic route data displayed on a display unit of the mobile terminal.

If it is determined that the support vehicle 6H cannot pass through the basic route La, the generation unit 13 generates the alternative route data. After the alternative route data has been generated, the display control unit 18 causes the display device 5 to display the alternative route data indicating the alternative route Lb. The display control unit 18 causes the display device 5 to display the alternative route data indicating the alternative route Lb together with the map data of the vicinity of the accident site.

The alternative route data and the route status data are transmitted from the computer system 4 to the mobile terminal held by the worker who drives the allocated support vehicle 6H. The worker receives an instruction to move the support vehicle 6H to the predetermined position PJ2 via the mobile terminal. The worker can drive the support vehicle 6H so that the support vehicle 6H is carried to the predetermined position PJ2 passing through the alternative route La, while watching the alternative route data displayed on the display unit of the mobile terminal.

As described above, according to the present embodiment, if it is determined that it is difficult to move the support vehicle 6H quickly to the predetermined position PJ2 based on the route status data of the basic route La, the alternative route data is generated. Accordingly, route planning of the support vehicle 6H is appropriately performed based on the alternative route data displayed on the display device 5.

Ninth Embodiment

A ninth embodiment is described. In the following descriptions, constituent elements like or equivalent to those in the above embodiments are denoted by like reference signs and descriptions thereof will be simplified or omitted.

In the above embodiments, it is assumed that the decision-making support system 100 including the article-arrangement planning system 10B is applied to plant facilities. The article-arrangement planning system 10B can be applied not only to plant facilities, but also to various applicable targets, for example, traffic facilities such as motorways or railways, or building facilities such as condominium buildings or commercial facilities.

An example in which the article-arrangement planning system 10B is applied to the traffic facilities including motorways is described below.

If an abnormality occurs on, for example, a motorway, the article-arrangement planning system 10B acquires the arrangement status data indicating the arrangement status of articles to be arranged to respond to the abnormality. The display control unit 18 causes the display device 5 to display the arrangement status data.

A collapse on a road surface of a motorway, accumulation of snow on the motorway, an accident on the motorway, and the like are exemplified as the abnormality on the motorway.

Articles to be arranged to respond to the abnormality on the motorway includes at least one of transportable articles and movable emergency vehicles. For example, as the articles when the road surface of the motorway has collapsed, a construction machine that repairs the motorway, and materials (gravels, an asphalt material, and the like) to repair the collapse are exemplified. As the articles at the time of accumulation of snow on the motorway, an antifreezing agent, a snow-plow truck, vehicles of the Japan Self-Defense Forces, and the like are exemplified. As the articles at the time of occurrence of an accident on the motorway, medical devices, first aid devices, medicines, clothes, blankets, a tow truck, a crane truck, and the like are exemplified.

An example in which the arrangement status data of articles to be arranged at the time of occurrence of an accident due to accumulation of snow on the motorway is acquired is described in the present embodiment.

As described above with reference to FIG. 19, the article-arrangement planning system 10B includes the arrangement-status-data acquisition unit 85. The arrangement status data includes at least one of the target amount data indicating a target amount of articles, the expected arrival time data indicating an expected time of arrival of the articles to the accident site, the actual amount data indicating a secured amount of arranged articles, and the position data indicating the position of the transport vehicle that transports the articles to the accident site.

Next, an example of the article-arrangement planning method according to the present embodiment is described. In the following descriptions, it is assumed that the computer system 4 in the article-arrangement planning system 10B is mounted on an emergency vehicle that has arrived at the site of the accident.

If an accident occurs due to accumulation of snow on the motorway and articles for responding to the accident are required, request data is output to external facilities from the computer system 4, for example, mounted on an emergency vehicle having arrived at the site of the accident. The request data includes the article data indicating articles required in the site of the accident, the target amount data indicating a target amount of the articles, and the desired arrival time data indicating the desired arrival time of the articles.

Transport of articles is started. The arrangement-status-data acquisition unit 85 acquires arrangement status data indicating each arrangement status of the plurality of articles. The display control unit 18 causes the display device 5 mounted on an emergency vehicle to display the article data indicating the articles.

Figure 27:
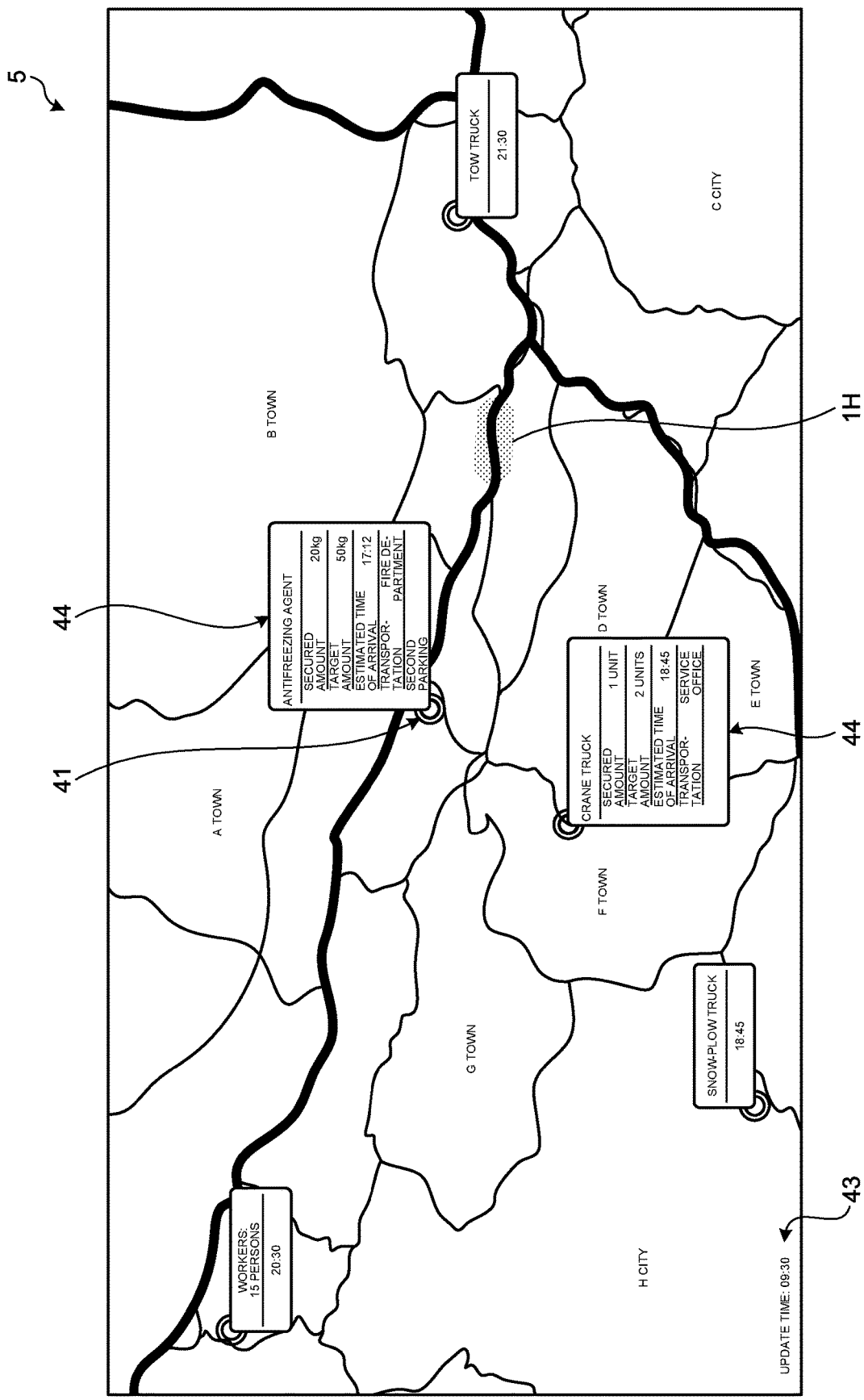
FIG. 27 is a diagram illustrating an example of the display device according to a ninth embodiment.

FIG. 27 is a diagram illustrating an example of the display device 5 according to the present embodiment. As illustrated in FIG. 27, the display control unit 18 causes the display device 5 to display item data 44 in which the article data is displayed in association with the arrangement status data. The item data 44 includes article data (an antifreezing agent and the like), actual amount data (a secured amount), target amount data (a target amount), expected arrival time data (an expected arrival time), and affiliation data (affiliation). The item data 44 also includes traffic data indicating the status of the transport route of the transport means 30, and planned route data indicating the planned route of the transport means 30.

The arrangement status data includes the position data indicating the positions of the support vehicles. In the present embodiment, the position data of the support vehicles is illustrated by icons 41. FIG. 27 illustrates an example in which four support vehicles (articles) including a transport vehicle that transports an antifreezing agent, a crane truck, a tow truck, and a snow-plow truck are travelling toward a site 1H of the accident.

The display control unit 18 causes the display device 5 to display the position data and the item data 44 in association with each other. Accordingly, it can be quickly recognized which support vehicle is transporting articles, and what articles and how many articles the support vehicle is transporting. Further, it can be quickly recognized which support vehicle is currently located where and when it will arrive at the site.

The display control unit 18 causes the display device 5 to display the position data of the support vehicle on a real-time basis. The display control unit 18 sequentially updates the position data of the support vehicle to the latest position data and causes the display device 5 to display the latest position data of the support vehicle. Further, the display control unit 18 causes the display device 5 to display update time data 43 indicating the update time at which the position data of the support vehicle has been updated.

As described above, according to the present embodiment, the display control unit 18 causes the display device 5 to display the article data in association with the arrangement status data. Therefore, a worker of an emergency vehicle that has arrived at the site of an accident can perform planning for quickly arranging necessary and sufficient articles based on the display result on the display device 5.

The abnormal condition data satisfying the priority display standard as described in the eighth embodiment includes facility data having been changed at a change rate exceeding the reference value set in advance in, for example, traffic facilities or oil/gas facilities. Regarding the traffic facilities, the facility data includes, for example, rainfall amount data indicating a rainfall amount having been changed at a change rate exceeding the reference value set in advance, the wind speed data indicating a wind speed having been changed at a change rate exceeding the reference value, the river water level data indicating a water level of a river having been changed at a change rate exceeding the reference value, and the snow accumulation data indicating an accumulation amount of snow having been changed at a change rate exceeding the reference value. Regarding the oil/gas facilities, the facility data includes, for example, temperature data indicating the temperature of the facility having been changed at a change rate exceeding the reference value, and pressure data indicating a facility pressure having been changed at a change rate exceeding the reference value. The display device 5 displays the display data generated based on these pieces of data.

The processes in the route planning system 10A and the article-arrangement planning system 10B described in the above embodiments can be realized by a computer program to be executed by a computer. For example, it is possible to configure that a computer program provided from a server and the like is installed in the computer system 4 described above, and the computer system 4 performs the processes described above in accordance with the computer program.

Figure 28:
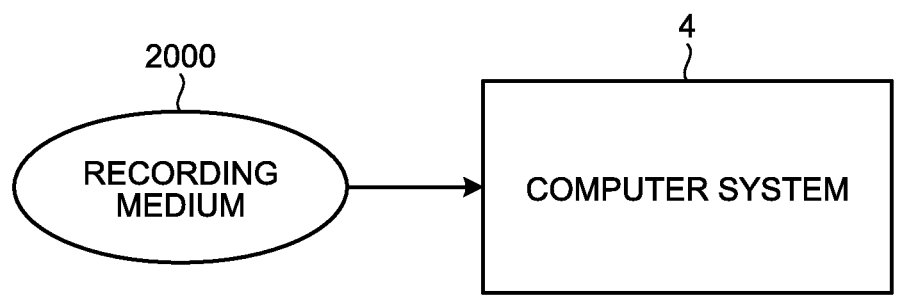
FIG. 28 is a diagram illustrating a recording medium according to the present embodiment.

Further, as illustrated in FIG. 28, it is possible to configure that a computer program is recorded in a recording medium 2000, and the computer system 4 is caused to read the computer program therein to realize the processes described above. As the recording medium 2000, various types of media can be used, such as a recording medium that records therein information optically, electrically, or magnetically like a CD-ROM, a flexible disk, or a magnetooptical disk, or a semiconductor memory that records therein information electrically like a ROM or a flash memory.

Although some embodiments have been described above, the present invention is not limited to the above embodiments, and various modifications and changes can be made within the scope of the claims.

REFERENCE SIGNS LIST 1 plant
2 construction
2A first construction
2B second construction
3 existing device
3A existing pump
3B existing power source
4 computer system
5 display device
5A main screen
5B, 5Ba, 5Bb sub-screen 5S audio output device
6 transportable device
6A transportable pump
6B transportable power source
7, 7A, 7B vehicle
8 device vehicle
8A pump vehicle
8B power source vehicle
9 mobile terminal
10A route planning system
10B, 10Ba, 10Bb article-arrangement planning system
11 interface unit
12 information management unit
13 generation unit
14 estimation unit
15 storage unit
16 determination unit
17 simulation unit
18 display control unit
19 database unit
20 input device
21 communication device
22 position detection device
23 monitoring camera
24 arrangement-status management unit
25 transmission unit
26 reception unit
30 transport vehicle (transport means)
31 plant system
32 emergency-operation-parameter transfer system
33 sub-system
40, 41 icon
43 update time data
50 relay device
60 synchronization management unit
70 network
80 data acquisition unit
81 route-status-data acquisition unit
82 area-status-data acquisition unit
83 position-data acquisition unit
84 priority-data acquisition unit
85 arrangement-status-data acquisition unit
100, 100A, 100B, 100C, 100D, 100E decision-making support system
130 instruction unit
190 database unit
300 electric device
600 area
1000 management system
2000 recording medium
La basic route
Lb alternative route

The invention claimed is:

1. A route planning system, comprising:
a display device;
a display control unit configured to cause the display device to display a support facility of a plurality of support facilities determined as not damaged in a display mode different from another support facility of the plurality of support facilities determined as damaged; and
a route-status-data acquisition unit configured to acquire route status data indicating a status of a basic route through which a non-damaged support facility of the plurality of support facilities is moved from a standby position to a predetermined position in case of emergency of an existing facility;
a generation unit configured to,
in response to the route status data including damage data indicating a damage status at a specific position in the basic route, said damage status indicating that the non-damaged support facility of the plurality of support facilities is not movable to the predetermined position through the basic route,
generate an alternative route data indicating an alternative route for moving the non-damaged support facility of the plurality of support facilities to the predetermined position based on the route status data, and
generate construction-machine route data indicating a construction machine route, through which a construction machine for restoring the specific position is moved to the specific position, based on the route status data.

2. The route planning system according to claim 1, wherein
the existing facility includes an existing device, and
the non-damaged support facility of the plurality of support facilities includes a transportable device that substitutes for the existing device.

3. The route planning system according to claim 1, further comprising an area-status-data acquisition unit configured to acquire area status data indicating a status of an area in which the existing facility is present, wherein
the generation unit is configured to generate the alternative route data by deciding the predetermined position based on the area status data.

4. The route planning system according to claim 1, wherein the route status data further includes restoration data indicating a restoration status of damage at the specific position in the basic route.

5. The route planning system according to claim 1, further comprising an estimation unit configured to estimate one or both of a moving time required for the non-damaged support facility of the plurality of support facilities passing through the alternative route to arrive at the predetermined position and a moving distance thereof.

6. A route planning system, comprising:
a display device;
a display control unit configured to cause the display device to display a support facility of a plurality of support facilities determined as not damaged in a display mode different from another support facility of the plurality of support facilities determined as damaged;
a route-status-data acquisition unit configured to acquire route status data indicating a status of a basic route through which a non-damaged support facility of the plurality of support facilities is moved from a standby position to a predetermined position in case of emergency of an existing facility;
a generation unit configured to,
in response to the route status data including damage data indicating a damage status at a specific position in the basic route, said damage status indicating that the non-damaged support facility of the plurality of support facilities is not movable to the predetermined position through the basic route,
generate an alternative route data indicating an alternative route for moving the non-damaged support facility of the plurality of support facilities to the predetermined position based on the route status data; and
an estimation unit configured to, in response to the generation of the alternative route data,
  estimate one or both of a moving time required for the non-damaged support facility of the plurality of support facilities passing through the alternative route to arrive at the predetermined position and a moving distance thereof, and
  estimate a moving time required for the non-damaged support facility of the plurality of support facilities passing through the basic route to arrive at the predetermined position, taking into consideration an expected restoration time required for restoring the specific position.

7. The route planning system according to claim 5, wherein the display control unit is configured to cause the display device to display
  the alternative route data, and
  one or both of moving time data indicating the moving time and moving distance data indicating the moving distance, estimated by the estimation unit.

8. The route planning system according to claim 1, further comprising:
  a priority-data acquisition unit configured to acquire priority data indicating at least one of
    a moving time required for the non-damaged support facility of the plurality of support facilities to arrive at the predetermined position,
    a moving distance of the non-damaged support facility of the plurality of support facilities to the predetermined position,
    a gradient of a road surface on which the non-damaged support facility of the plurality of support facilities travels until arriving at the predetermined position,
    a curvature of a road surface on which the non-damaged support facility of the plurality of support facilities travels until arriving at the predetermined position, or
    a width of the road surface on which the non-damaged support facility of the plurality of support facilities travels until arriving at the predetermined position, wherein
  the generation unit is configured to generate the alternative route data based on the priority data.

9. A decision-making support system for supporting decision making of measures in case of emergency, the decision-making support system comprising:
  the route planning system according to claim 1; and
  an information management unit configured to share abnormal condition data including the alternative route data required in case of emergency via a network.

10. A route planning method, comprising:
  causing a display device to display a support facility of the plurality of support facilities determined as not damaged in a display mode different from another support facility of the plurality of support facilities determined as damaged,
  acquiring route status data indicating a status of a basic route for moving a non-damaged support facility of the plurality of support facilities from a standby position to a predetermined position in case of emergency of an existing facility;
  in response to the route status data including damage data indicating a damage status at a specific position in the basic route, said damage status indicating that the non-damaged support facility of the plurality of support facilities is not movable to the predetermined position through the basic route,
    generating alternative route data indicating an alternative route for moving the non-damaged support facility of the plurality of support facilities to the predetermined position based on the route status data;
    generating construction-machine route data indicating a construction machine route, through which a construction machine for restoring the predetermined position is moved to the predetermined position, based on the route status data; and
    causing the display device to display the alternative route data.

11. The route planning system according to claim 1, wherein a relay device arranged at the predetermined position is configured to connect to the non-damaged support facility of the plurality of support facilities comprising a transportable power source.

12. The route planning system according to claim 1, wherein the specific position is a point of equipment failure and the predetermined position is a point of equipment restoration.

* * * * *